US008528676B2

(12) United States Patent
Endo et al.

(10) Patent No.: US 8,528,676 B2
(45) Date of Patent: Sep. 10, 2013

(54) CONTROL APPARATUS FOR HYBRID DRIVE SYSTEM

(75) Inventors: Hiroatsu Endo, Nagoya (JP); Kentaro Kakuse, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 541 days.

(21) Appl. No.: 12/528,730

(22) PCT Filed: Feb. 15, 2008

(86) PCT No.: PCT/JP2008/052575
§ 371 (c)(1),
(2), (4) Date: Aug. 26, 2009

(87) PCT Pub. No.: WO2008/105246
PCT Pub. Date: Sep. 4, 2008

(65) Prior Publication Data
US 2010/0102767 A1    Apr. 29, 2010

(30) Foreign Application Priority Data

Feb. 28, 2007    (JP) ................................. 2007-050673

(51) Int. Cl.
*B60W 20/00*    (2006.01)
(52) U.S. Cl.
USPC ....................... 180/65.285; 903/917; 903/930
(58) Field of Classification Search
USPC ................... 180/65.21, 65.26, 65.27, 65.285; 903/917, 930, 945; 477/2, 3
See application file for complete search history.

(56) References Cited

U.S. PATENT DOCUMENTS

| 5,789,881 | A  | * | 8/1998  | Egami et al.   | 318/139   |
|-----------|----|---|---------|----------------|-----------|
| 5,928,301 | A  | * | 7/1999  | Soga et al.    | 701/51    |
| 6,299,563 | B1 | * | 10/2001 | Shimasaki      | 477/5     |
| 6,430,483 | B2 | * | 8/2002  | Takaoka et al. | 701/22    |
| 6,543,561 | B1 | * | 4/2003  | Pels et al.    | 180/65.23 |
| 6,566,826 | B2 | * | 5/2003  | Imai et al.    | 318/11    |
| 6,685,591 | B2 | * | 2/2004  | Hanyu et al.   | 475/5     |

FOREIGN PATENT DOCUMENTS

| JP | 63133854   | 6/1988 |
| JP | 04021305   | 1/1992 |
| JP | 06-090507 A | 3/1994 |
| JP | 07096759   | 4/1995 |
| JP | 09226392   | 9/1997 |
| JP | 09226393   | 9/1997 |

(Continued)

*Primary Examiner* — Frank Vanaman
(74) *Attorney, Agent, or Firm* — Sughrue Mion, PLLC

(57) ABSTRACT

A control apparatus for a hybrid drive system including a main drive power source, an electric generator, a wheel-side output shaft, a power distributing mechanism for distributing the drive force of the main drive power source to the electric generator, the wheel-side output shaft and an automatic transmission, and an electric motor connected to the wheel-side output shaft through the automatic transmission, the control apparatus including a motor-output limitation control device for implementing an output limitation of the electric motor according to a requirement for the output limitation, and a motor-output limitation inhibiting device to inhibit the output limitation of the electric motor by the motor-output limitation control device, during a shift-up action of the automatic transmission, or a motor-output increasing device to control the electric motor to increase its output so as to offset the output limitation of the electric motor implemented by the motor-output limitation control device according to a requirement for the output limitation during a shift-up action of the automatic transmission.

10 Claims, 10 Drawing Sheets

(56) References Cited

FOREIGN PATENT DOCUMENTS

| | | |
|---|---|---|
| JP | 09267647 | 10/1997 |
| JP | 10341503 | 12/1998 |
| JP | 11198671 | 7/1999 |
| JP | 11227476 | 8/1999 |
| JP | 11240346 | 9/1999 |
| JP | 2000289471 | 10/2000 |
| JP | 2002-225578 A | 8/2002 |
| JP | 2005-102420 A | 4/2005 |
| JP | 2005096574 | 4/2005 |
| JP | 2005-297948 A | 10/2005 |
| JP | 2006-115586 A | 4/2006 |
| JP | 2006-194412 A | 7/2006 |
| JP | 2006-275175 A | 10/2006 |

* cited by examiner

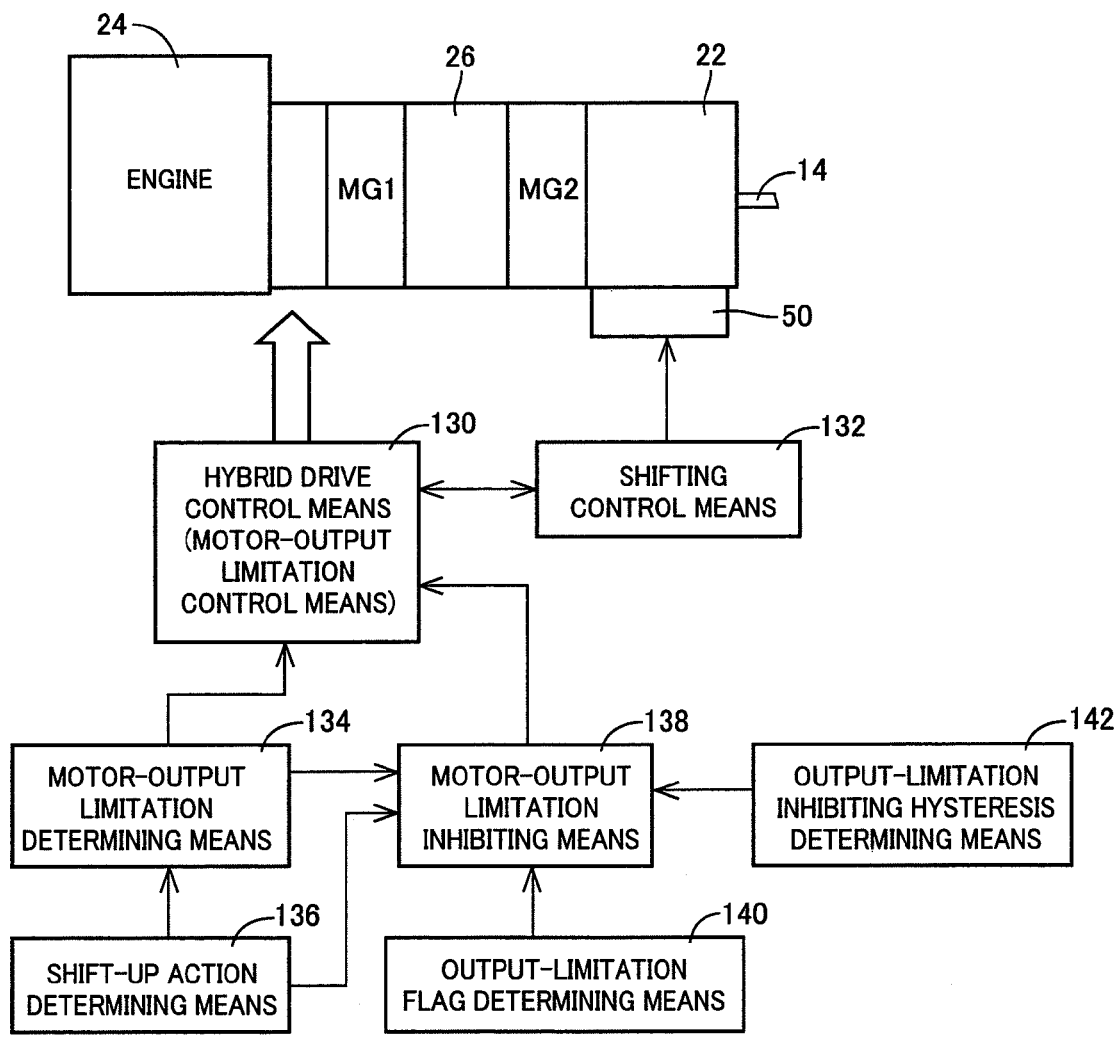

CONTROL APPARATUS FOR HYBRID DRIVE SYSTEM

TECHNICAL FIELD

The present invention relates to a control apparatus for a hybrid drive system wherein an electric motor is connected through an automatic transmission to a wheel-side output shaft to which a drive force of a main drive power source is distributed by a power distributing mechanism, and more particularly to techniques for limiting an output of the electric motor.

BACKGROUND ART

There is known a control apparatus for a hybrid drive system including a main drive power source, a power distributing mechanism for distributing a drive force of the main drive power source to an electric generator and a wheel-side output shaft, and an electric motor connected through an automatic transmission to the wheel-side output shaft.

Patent Document 1 discloses an example of a control apparatus for such a hybrid drive system including an engine, a power distributing mechanism in the form of a planetary gear mechanism for distributing a drive force of the engine to a first electric motor operable to generate an electric energy, and to an output shaft, and a second electric motor connected to the output shaft through an automatic transmission which has selectable two gear positions. The control apparatus disclosed in this publication is configured to control the engine, first electric motor, second electric motor and automatic transmission so that the hybrid drive system generates a required drive force corresponding to a required torque calculated on the basis of an operation amount of an accelerator pedal and a running speed of a hybrid vehicle.

For controlling the operating states of the engine, first electric motor and second electric motor, in particular, a major portion of the drive force of the engine is mechanically transmitted to the output shaft by a differential function of the planetary gear mechanism, and the remaining portion of the drive force of the engine is converted into an electric energy by the first electric motor operated as an electric generator, which electric energy is supplied through an inverter to an electric-energy storage device and the second electric motor, so that the second electric motor is operated with the electric energy, to generate a drive force to be transmitted to the output shaft. For supplying the electric energy from the first electric motor to the electric-energy storage device and the second electric motor, the hybrid drive system has a so-called "electric path". An amount of electric energy to be supplied to the electric-energy storage device is increased and reduced according to an amount of electric energy consumption by the second electric energy, that is, according to an output of the second electric motor.

The control apparatus for this type of hybrid drive system is configured to implement a so-called "iso-power shifting control" to control a speed ratio of the automatic transmission while the output of the second electric motor is held substantially constant with the amount of its electric energy consumption kept substantially constant to equalize an amount of charging and an amount of discharging of the electric energy of the electric-energy storage device, with each other for the purpose of reducing a load of the electric-energy storage device. Namely, an output torque of the second electric motor is changed according to a change of its operating speed during a shifting action of the automatic transmission, so that an output of the second electric motor determined by a product of its output torque and speed is held substantially constant.

On the other hand, Patent Document 2 discloses a control apparatus configured to reduce a commanded value of the output torque of an electric motor when the electric motor is placed in an overheating state in a high-load running state of the vehicle, for example, for thereby limiting the output of the electric motor.

Patent Document 1: JP-2005-297948 A
Patent Document 2: JP-6-90507 A

DISCLOSURE OF THE INVENTION

Problem Solved by the Invention

For controlling the operating speed of an electric motor, an output signal of a speed sensor is processed by a filter to remove mechanical and electric noises, to detect the speed of the electric motor (hereinafter referred to as "sensed speed"). When the actual operating speed of the electric motor (hereinafter referred to as "actual speed") changes, a change of the sensed speed is delayed by a given length of time with respect to the change of the actual speed (this delay being hereinafter referred to as "sensed speed delay"). When the actual speed drops during a shift-up action of the automatic transmission, the sensed speed is higher than the actual speed due to the sensed speed delay, during a drop of the sensed speed which is delayed with respect to the drop of the actual speed.

During the iso-power shifting control of the automatic transmission, therefore, the torque of the electric motor is increased to hold the output of the electric motor substantially constant, on the basis of the sensed speed which is lowered in delayed timing with respect to the actual speed, so that an increase of the torque of the electric motor is delayed with respect to a target value for holding the output of the electric motor constant, whereby the actual output of the electric motor (=motor torque based on the sensed speed×actual speed) is made smaller than an iso-power value. Accordingly, a difference of the actual output with respect to the iso-power value is stored in the electric-energy storage device, so that the electric-energy storage device tends to be overcharged.

The above-identified Patent Document 1 discloses an operation to limit the amount of charging of the electric-energy storage device, on the basis of the amount of electric energy stored in the electric-energy storage device and its temperature. In this case, the charging of the electric-energy storage device during a shift-up action of the automatic transmission as described above may give rise to a risk that the amount of electric energy stored in the electric-energy storage device exceeds an upper limit used for limiting the amount of charging. It is considered possible to provide a sufficient control margin of the actual speed of the electric motor, which control margin corresponds to the sensed speed delay, for accelerating the increase of the output torque of the electric motor, to limit the amount of charging of the electric-energy storage device, where further charging of the electric-energy storage device during the shift-up action of the automatic transmission should be avoided. The above-indicated control margin will be referred to as "sensed-speed-delay-related control margin".

However, where a shift-up action of the automatic transmission and the output limiting operation of the electric motor take place concurrently, the electric motor is not operated sufficiently with a result of consumption of the electric energy, and the above-indicated sensed-speed-delay-related control margin becomes insufficient, giving rise to a risk of overcharging of the electric-energy storage device with the stored energy amount exceeding the upper limit.

The present invention was made in view of the background art discussed above. It is therefore an object of the present invention to provide a control apparatus for a hybrid drive system, which assures sufficient protection of an electric-energy storage device even in an operating environment of the hybrid drive system involving a sensed speed delay of an electric motor during a shift-up action of an automatic transmission.

Means for Solving the Problem

The object indicated above can be achieved according to a first mode of the present invention, which provides a control apparatus (a) for a hybrid drive system including a main drive power source, a power distributing mechanism for distributing a drive force of the main drive power source to an electric generator and a wheel-side output shaft, and an electric motor connected to the wheel-side output shaft through an automatic transmission, the control apparatus being characterized in that (b) motor-output limitation control means is provided for implementing an output limitation of the above-indicated electric motor according to a requirement for the output limitation, and (c) the control apparatus inhibits the output limitation of the electric motor by the above-indicated motor-output limitation control means, during a shift-up action of the above-indicated automatic transmission.

According to a second mode of the invention, the control apparatus does not inhibit the output limitation of the electric motor by the motor-output limitation control means, if the output limitation is initiated before initiation of the shift-up action of the automatic transmission.

The object can also be achieved according to a third mode of this invention, which provides a control apparatus (a) for a hybrid drive system including a main drive power source, a power distributing mechanism for distributing a drive force of the main drive power source to an electric generator and a wheel-side output shaft, and an electric motor connected to the wheel-side output shaft through an automatic transmission, the control apparatus being characterized in that (b) motor-output limitation control means is provided for implementing an output limitation of the above-indicated electric motor according to a requirement for the output limitation, and (c) the control apparatus controls the electric motor to increase its output so as to offset the output limitation of the electric motor implemented by the above-indicated motor-output limitation control means according to a requirement for the above-indicated output limitation during a shift-up action of the above-indicated automatic transmission.

According to a fourth mode of the invention, which is a preferred form of the third mode, the control apparatus for the hybrid drive system does not control the electric motor so as to offset the output limitation by the motor-output limitation control means, if the output limitation is initiated before initiation of the shift-up action of the automatic transmission.

According to a fifth mode of the invention, which is a preferred form of any one of the first through fourth modes, the control apparatus for the hybrid drive system makes a determination as to whether it is required to implement the output limitation of the electric motor, on the basis of a rise of a temperature of the electric motor.

According to a sixth mode of the invention, which is a preferred form of any one of the first through fifth modes, the control apparatus for the hybrid drive system makes a determination as to whether it is required to implement the output limitation of the electric motor, on the basis of a rise of a temperature of a lubricant used for cooling the electric motor.

According to a seventh form of the invention, which is a preferred form of any one of the first through sixth modes, the control apparatus for the hybrid drive system makes a determination as to whether it is required to implement the output limitation of the electric motor, on the basis of a rise of a temperature of a component associated with the electric motor.

Advantages of the Invention

According to the control apparatus for the hybrid drive system, which is constructed according to the first mode of this invention, the output limitation of the electric motor by the motor-output limitation control means according to the requirement for the output limitation is inhibited during the shift-up action of the automatic transmission, so that the electric motor is operated for a sufficient amount of electric energy consumption even in an operating environment involving a sensed speed delay due to the shift-up action of the automatic transmission, whereby it is possible to reduce a risk of excessive charging of an electric-energy storage device, for sufficient protection of the electric-energy storage device.

Preferably, the control apparatus for the hybrid drive system does not inhibit the output limitation of the electric motor by the motor-output limitation control means, if the output limitation is initiated before initiation of the shift-up action of the automatic transmission. Accordingly, the electric motor can be protected. Namely, where the output limitation of the electric motor is initiated before initiation of the shift-up action, it is considered that there is a high necessity for protecting the electric motor. It is also noted that the absolute amount of the electric motor torque during the shift-up action of the automatic transmission is relatively small, and the amount of reduction of the output of the electric motor with respect to the iso-power value due to the sensed speed delay during the shift-up action (namely, an amount of input to the electric-energy storage device) is relatively small. Therefore, the output limitation of the electric motor is less likely to have an adverse influence on the electric-energy storage device, even if the output limitation is not inhibited. In this case, therefore, the output limitation of the electric motor for the purpose of protecting the electric motor need not be inhibited, but is continued. Where the output limitation of the electric motor is initiated after initiation of the shift-up action, on the other hand, the amount of reduction of the electric motor output with respect to the iso-power value due to the sensed speed delay is made relatively large, and the output limitation is likely to have an adverse influence on the electric-energy storage device. Further, it is considered that the necessity for rapidly protecting the electric motor is not so high, and that the output limitation of the electric motor may be delayed until the shift-up action is terminated. In this respect, the output limitation of the electric motor is inhibited for protecting the electric-energy storage device. Thus, either the electric motor or the electric-energy storage device is protected depending upon the situation, for sufficient protection of the electric motor and electric-energy storage device.

According to the control apparatus for the hybrid drive system, which is constructed according to the third mode of the invention, the output of the electric motor is increased so as to offset the output limitation of the electric motor implement by the output-limitation control means according to the requirement for the output limitation during the shift-up action of the automatic transmission. Accordingly, the electric motor is operated for a sufficient amount of electric energy consumption even in an operating environment involving a sensed speed delay due to the shift-up action of the automatic transmission, whereby it is possible to reduce a risk of excessive charging of an electric-energy storage device, for sufficient protection of the electric-energy storage device.

Preferably, the control apparatus for the hybrid drive system controls the electric motor so as not to increase its output so as to offset the output limitation of the electric motor, if the output limitation is initiated before initiation of the shift-up action of the automatic transmission. Eventually, the output of the electric motor is limited, so that the electric motor can be protected. Namely, where the output limitation of the electric motor is initiated before initiation of the shift-up action, it is considered that there is a high necessity for protecting the electric motor. It is also noted that the absolute amount of the electric motor torque during the shift-up action of the automatic transmission is relatively small, and the amount of reduction of the output of the electric motor with respect to the iso-power value due to the sensed speed delay during the shift-up action (namely, an amount of input to the electric-energy storage device) is relatively small. Therefore, the output limitation of the electric motor is less likely to have an adverse influence on the electric-energy storage device, even if the output is not increased. In this case, therefore, the output limitation of the electric motor for the purpose of protecting the electric motor need not be inhibited, but is continued. Where the output limitation of the electric motor is initiated after initiation of the shift-up action, on the other hand, the amount of reduction of the electric motor output with respect to the iso-power value due to the sensed speed delay is made relatively large, and the output limitation is likely to have an adverse influence on the electric-energy storage device. Further, it is considered that the necessity for rapidly protecting the electric motor is not so high, and that the output limitation of the electric motor may be delayed until the shift-up action is terminated. In this respect, the output of the electric motor is increased so as to offset the output limitation of the electric motor implemented for protecting the electric-energy storage device. Thus, either the electric motor or the electric-energy storage device is protected depending upon the situation, for sufficient protection of the electric motor and electric-energy storage device.

Preferably, the control apparatus for the hybrid drive system makes a determination as to whether it is required to implement the output limitation of the electric motor, on the basis of a rise of a temperature of the electric motor. Accordingly, the output limitation of the electric motor for protecting the electric motor can be adequately implemented by the motor-output limitation control means.

Preferably, the control apparatus for the hybrid drive system makes a determination as to whether it is required to implement the output limitation of the electric motor, on the basis of a rise of a temperature of a lubricant used for cooling the electric motor. Accordingly, the output limitation of the electric motor for protecting the electric motor can be adequately implemented by the motor-output limitation control means.

Preferably, the control apparatus for the hybrid drive system makes a determination as to whether it is required to implement the output limitation of the electric motor, on the basis of a rise of a temperature of a component associated with the electric motor. Accordingly, the output limitation of the electric motor for protecting the electric motor can be adequately implemented by the motor-output limitation control means.

Preferably, the automatic transmission is a multiple-step planetary gear type transmission of various configurations having a plurality of gear positions including two or three forward-drive positions, which are selectively established by selective connection of rotary elements of a plurality of planetary gear sets by means of frictional coupling devices.

Preferably, the above-indicated frictional coupling devices are hydraulically operated frictional coupling devices such as multiple-disc type or single-disc type clutches and brakes or belt-type brakes, which are engaged by hydraulic actuators. An oil pump used for delivering a working fluid for engaging these hydraulically operated frictional coupling devices may be driven by a vehicle drive power source, or an exclusive drive power source such as an electric motor provided in addition to the vehicle drive power source. Further, the hydraulically operated clutches and brakes may be replaced by electromagnetic coupling devices such as electromagnetic clutches or magnetic power type clutches.

Preferably, the main drive power source is an internal combustion engine such as a gasoline or diesel engine, and the power distributing mechanism is a differential mechanism constituted by a planetary gear set, for instance, so that the hybrid drive system utilizes the differential function of the differential mechanism so that a major portion of the output of the drive force of the engine is mechanically transmitted to the wheel-side output shaft, while the rest of the drive force of the engine is electrically transmitted from the electric generator to the electric motor through an electric path therebetween.

Preferably, the hybrid drive system is installed such that the axis of the hybrid drive system is parallel to the transverse direction of an FF vehicle (front-engine front-drive vehicle), or parallel to the longitudinal direction of an FR vehicle (front-engine rear-drive vehicle).

Preferably, the main drive power source and the power distributing mechanism are operatively connected to each other, through a suitable device such as a pulsation absorbing damper (vibration damping device), a direct coupling clutch, a direct coupling clutch with a damper, or a fluid-operated power transmitting device. However, the main drive power source and the power distributing mechanism may be permanently connected to each other. The fluid-operated power transmitting device may be a torque converter with a lock-up clutch, or a fluid coupling.

BRIEF DESCRIPTION OF THE DRAWINGS

FIG. 7 is a table for explaining an operation of the hydraulic control circuit.

FIG. 8 is a functional block diagram for explaining major control functions of electronic control devices shown in FIG. 1.

NOMENCLATURE OF ELEMENTS

Figure 1:
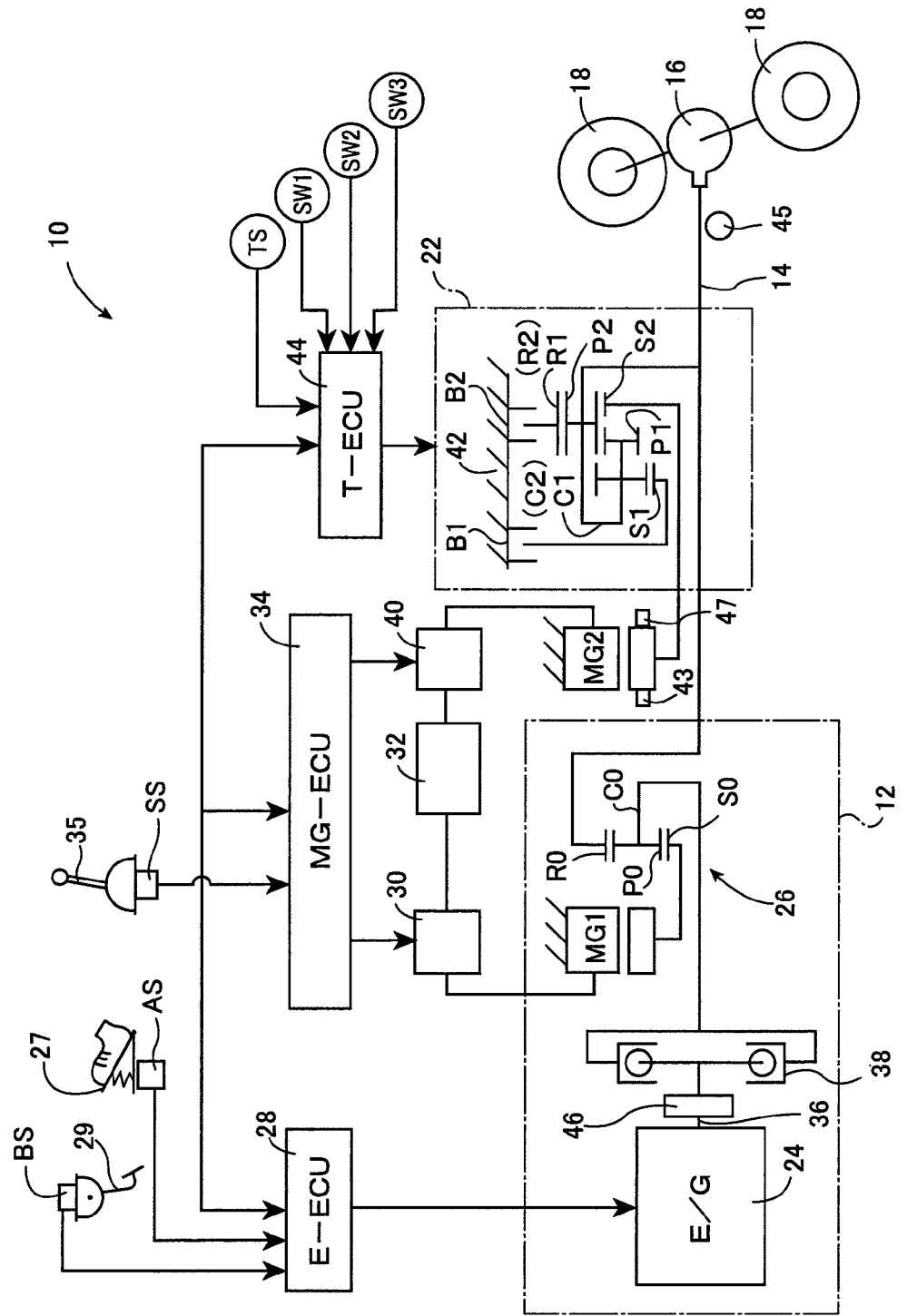
FIG. 1 is a block diagram for explaining a hybrid drive system to which the present invention is applicable, and for explaining major portions of a control system provided on a vehicle to control the hybrid drive system, etc.

10: Hybrid drive system
14: Wheel-side output shaft
22: Automatic transmission
24: Engine
26: Planetary gear set (Power distributing mechanism)
28, 34, 44: Electronic control device (Control apparatus)
130: Hybrid drive control means (Electric-motor-output limitation control means)
MG1: First motor/generator (Electric generator)
MG2: Second motor/generator (Electric motor)

BEST MODE FOR CARRYING OUT THE INVENTION

Referring to the drawings, there will be described in detail a preferred embodiment of the present invention.

Embodiment

Referring to the schematic view of FIG. 1 for explaining a hybrid drive system 10 to which the present invention is applicable, the hybrid drive system 10 is arranged such that a torque of a main drive power source functioning as a first drive power source 12 is transmitted to a wheel-side output shaft (hereinafter referred to "output shaft") 14 functioning as an output member, from which a torque is transmitted to a pair of right and left drive wheels 18 through a differential gear device 16. The hybrid drive system 10 is provided with a second drive power source (auxiliary drive power source) in the form of a second motor/generator (hereinafter abbreviated as "MG2") which is operable to selectively perform a torque generating operation to generate a vehicle drive force and a regenerative operation to recover a kinetic energy. This MG2 is connected to the output shaft 14 through an automatic transmission 22. Accordingly, a torque capacity to be transmitted from the MG2 to the output shaft 14 is increased or reduced according to a speed ratio γs of the automatic transmission 22 (which is equal to rotating speed Nmg2 of the MG2/rotating speed Nout of the output shaft 14).

The automatic transmission 22 has a plurality of values of the speed ratio γs, which are higher than "1", so that the torque generated by the MG2 during its torque generating operation and to be transmitted to the output shaft 14 can be increased by the automatic transmission 22, whereby the required capacity and size of the MG2 can be made relatively small. When the rotating speed Nout of the output shaft 14 is relatively high during running of a vehicle at a relatively high speed, an operating speed Nmg2 of the MG2 (hereinafter referred to as "MG2 speed Nmg2") is lowered by reducing the speed ratio γs, for maintaining the MG2 in a highly efficient operating state. When the rotating speed Nout of the output shaft 14 is relatively low, the MG2 speed Nmg2 is raised by increasing the speed ratio γs.

The first drive power source 12 indicated above is constituted principally by a main drive power source in the form of an engine 24, a first motor/generator (hereinafter abbreviated as "MG1"), and a power distributing mechanism in the form of a planetary gear set 26 operable to synthesize a torque of the engine 24 and a torque of the MG1 or distribute one of these torques to the engine 24 or the MG1. The engine 24 is a known internal combustion engine such as a gasoline or diesel engine operable to generate a drive force by combustion of a fuel. An operating state of the engine 24 is electrically controlled by an electronic engine control device (E-ECU) 28 constituted principally by a microcomputer, which is configured to control an opening angle of a throttle valve, an intake air quantity, an amount of supply of a fuel and a timing of ignition of the engine 24. The electronic engine control device 28 is arranged to receive output signals of various sensors such as an accelerator operation-amount sensor AS provided to detect an operation amount of an accelerator pedal 27, and a brake sensor BS provided to detect an operation of a brake pedal 29.

The MG1, which is a synchronous motor, for example, is operable to function selectively as an electric motor to generate a drive torque, and an electric generator. The MG1 is connected through an inverter 30 to an electric-energy storage device 32 such as a battery or capacitor. An output torque or a regenerative torque of the MG1 is regulated or set by an electronic motor-generator control device (MG-ECU) 34 constituted principally by a microcomputer, which is configured to control the inverter 30. The electronic motor-generator control device 34 is arranged to receive output signals of various sensors such as a shift position sensor SS provided to detect an operating position of a shift lever 35.

The planetary gear set 26 is a planetary gear mechanism of a single-pinion type which is operable to perform a known differential function and which includes three rotary elements consisting of a sun gear S0, a ring gear R0 disposed coaxially with the sun gear S0, and a carrier C0 which supports a pinion gear P0 meshing with the sun gear S0 and ring gear R0, such that the pinion gear P0 is rotatable about its axis and about an axis of the carrier C0. The planetary gear device 26 is disposed coaxially with the engine 24 and the automatic transmission 22. Since the planetary gear device 26 and automatic transmission 22 are symmetric about their axes, a low half thereof is not shown in FIG. 1.

In the present hybrid drive system 10, a crankshaft 36 of the engine 24 is connected to the carrier C0 of the planetary gear device 26 through a damper 38, and the MG1 is connected to the sun gear S0, while the output shaft 14 is connected to the ring gear R0. It is noted that the carrier C0 functions as an input element, and the sun gear S0 functions as a reaction element, while the ring gear R0 functions as an output element.

Figure 2:
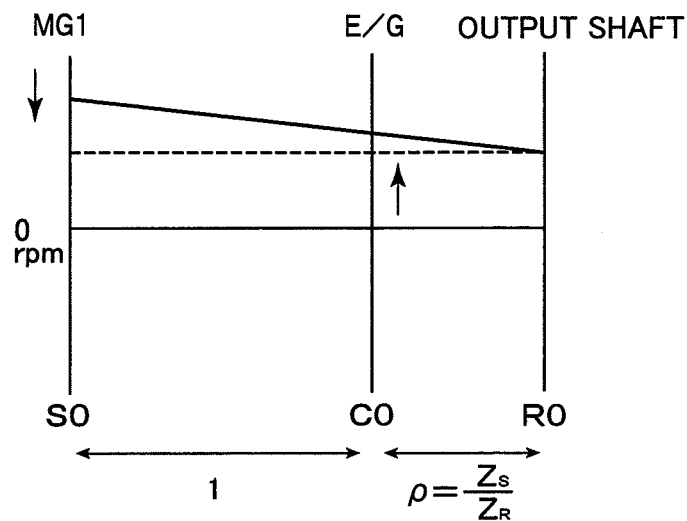
FIG. 2 is a collinear chart indicating relative rotating speed of rotary elements of a planetary gear set of a single-pinion type functioning as a torque synthesizing and distributing mechanism.

Referring to the collinear chart of FIG. 2, there are indicated relative rotating speeds of the rotary elements of the single-pinion type planetary gear set 26 functioning as the torque synthesizing and distributing mechanism. In this collinear chart, the rotating speeds of the sun gear S0, carrier C0 and ring gear R0 are taken along respective vertical axes S0, C0 and R0. Distances between adjacent ones of the vertical axes S0, C0, R0 are determined such that the distance between the vertical axes C0 and R0 corresponds to $\rho$ (number of teeth Zs of the sun gear S0/number of teeth Zr of the ring gear R0), where the distance between the vertical axes S0 and C0 corresponds to "1".

In the planetary gear device 26, the ring gear R0 generates an output torque larger than an output torque of the engine 24 when a reaction torque generated by the MG1 as a result of input of the output torque of the engine 24 to the carrier C0 is input to the sun gear S0. In this case, the MG1 functions as the electric generator. Further, an operating speed Ne of the engine 24 (hereinafter referred to as "engine speed Ne") is variable continuously (in a non-stepping manner) by changing an operating speed Nmg1 of the MG1 while the rotating speed of the ring gear R0, that is, the rotating speed Nout of the output shaft 14 (output shaft speed Nout) is held constant. Broken line in FIG. 2 indicates a drop of the engine speed Ne when the rotating speed Nmg1 of the MG1 is lowered from a value indicated by solid line. Namely, the engine speed Ne can be controlled to a value for highest fuel economy by controlling the MG1. The hybrid drive system 10 of this type is called a mechanical distribution type or split type.

Referring back to FIG. 1, the automatic transmission 22 is constituted by a planetary gear mechanism of a Ravigneaux type consisting of two planetary gear sets. Described in detail, the automatic transmission 22 includes a first sun gear S1, a second sun gear S2, a stepped pinion P1 having a large-diameter portion meshing with the first sun gear S1, a second pinion P2 meshing with a small-diameter portion of the stepped pinion P1, and a ring gear R1 (R2) which is disposed coaxially with the first and second sun gears S1, S2 and which meshes with the pinion P2. The pinions P1, P2 are supported by a common carrier C1 (C2) such that each pinion P1, P2 is rotatable about its axis and about the axis of the common carrier C1 (C2). Further, the second sun gear S2 meshes with the pinion P2.

The MG2, which functions as an electric motor or an electric generator, is controlled by the electronic motor-generator control device (MG-ECU) 34 through an inverter 40, to generate an assisting output torque or a regenerative torque. The MG2 is connected to the second sun gear S2, and the output shaft 14 is connected to the carrier C1. The first sun gear S1 and the ring gear R1 cooperate with the pinions P1, P2 to constitute a planetary gar set of a double-pinion type, while the second sun gear S and the ring gear R1 cooperate with the pinion P2 to constitute a planetary gear set of a single-pinion type.

The automatic transmission 22 is provided with a first brake B1 disposed between the first sun gear S1 and a housing 42 to selective fix the first sun gear S1 to the housing 42, and a second brake B2 disposed between the ring gear R1 and the housing 42 to selectively fix the ring gear R1 to the housing 42. These brakes B1, B2 are so-called frictional coupling devices arranged to generate a frictional braking force, which may be of a multiple-disc type or a band type. Torque capacities of the brakes B1, B2 are continuously variable according to engaging hydraulic pressures generated by respective first and second brake actuators B1A, B2A in the form of hydraulic cylinders, for example.

The automatic transmission 22 constructed as described above is placed in a high gear position H having a speed ratio γsh higher than "1" when the second sun gear S2 functions as an input element, and the carrier C1 functions as an output element, while the first brake B1 is placed in an engaged state. When the second brake B2 rather than the first brake B1 is placed in an engaged state, the automatic transmission 22 is placed in a low gear position L having a speed ratio γsl higher than the speed ratio γsh. That is, the automatic transmission 22 is a transmission having two speed positions or gear positions H, L, which are selectively established on the basis of a running condition of the vehicle such as a running speed V of the vehicle and a required vehicle drive force (as represented by the operating amount of the accelerator pedal). Described more specifically, the automatic transmission 22 is shifted to establish one of the two gear positions H, L on the basis of the detected running condition of the vehicle and according to a predetermined shifting boundary line map defining a shift-up boundary line and a shift-down boundary line for shifting actions between the two gear positions H, L. The shifting actions of the automatic transmission 22 are controlled by an electronic transmission control device (T-ECU) 44 constituted principally by a microcomputer.

The electronic transmission control device 44 is arranged to receive output signals of various sensors such as an MG2 speed sensor 43 provided to detect the MG2 speed Nmg2, and an output-shaft speed sensor 45 provided to detect the output shaft speed Nout corresponding to the vehicle speed V. The electronic transmission control device 44 further receives output signals of an MG2 temperature sensor 47 provided to detect a temperature THmg2 of the MG2 (hereinafter referred to as "MG2 temperature"), an oil temperature sensor TS provided to detect a temperature THoil of a working oil of the automatic transmission 22 (which is also used for lubricating and cooling the MG1, MG2), a hydraulic pressure switch SW1 provided to detect the engaging hydraulic pressure of the first brake B1, and a hydraulic pressure switch SW2 provided to detect the engaging hydraulic pressure of the second brake B2. The electronic transmission control device 44 further receives: a signal indicative of a temperature THbat of the electronic-energy storage device 32 (hereinafter referred to as "battery temperature"); a signal indicative of a charging or discharging current Icd of the electric-energy storage device 32 (hereinafter referred to as "charging/discharging current" or "input/output current"); a signal indicative of a voltage Vbat of the electronic-energy storage device 32; a signal indicative of a charging capacity (charging state) of the electric-energy storage device 32 calculated on the basis of the above-indicated battery temperature THbat, charging/discharging current Icd and voltage Vbat; signals indicative of temperatures of the inverters 30, 40; and a signal indicative of a temperature of a coolant used for cooling the inverters 30, 40.

Figure 3:
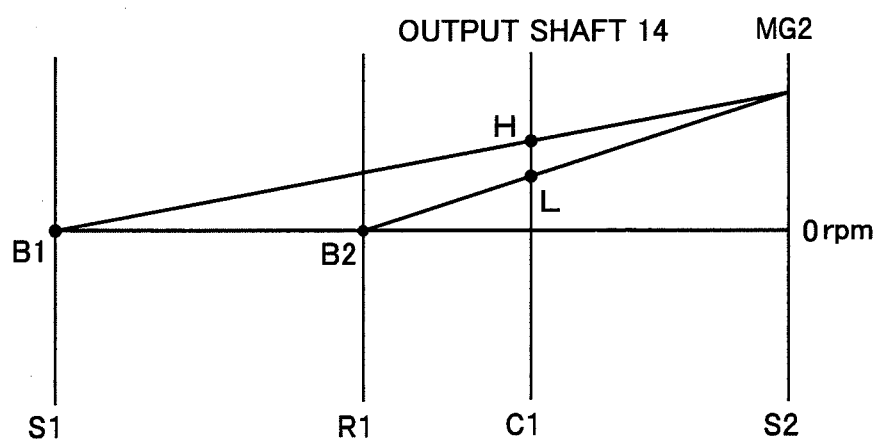
FIG. 3 is a collinear chart indicating a relationship among rotary elements of a planetary gear mechanism of a Ravigneaux type constituting a transmission.

Reference is now made to the collinear chart of FIG. 3 having four vertical axes S1, R1, C1, S2 indicating a relationship among the rotary elements of the Ravigneaux type planetary gear mechanism of the automatic transmission 22. In this collinear chart, the rotating speeds of the first sun gear S1, ring gear R1, carrier C1 and second sun gear S2 are taken along the respective vertical axes S1, R1, C1, S2.

The automatic transmission 22 constructed as described above is shifted to the low gear position L when the second brake B2 is engaged to fix the ring gear R1 to the housing 42. In this low gear position L, the assisting torque generated by the MG2 is amplified according to the speed ratio γsl of the low gear position L, and the amplified assisting torque is transmitted to the output shaft 14. When the first brake B1 is engaged to fix the first sun gear S1 to the housing 42, the automatic transmission 22 is shifted to the high gear position H having the speed ratio γsh lower than the speed ratio γsl of the low gear position L. The speed ratio γsh of the high gear position H is also higher than "1", so that the assisting torque generated by the MG2 is amplified according to the speed ratio γsh, and the amplified assisting torque is transmitted to the output shaft 14.

While the automatic transmission 22 is held in the low or high gear position L, H, the torque transmitted to the output shaft 14 is the output torque of the MG2 as amplified according to the speed ratio γsl or γsh of the automatic transmission 22. In the process of the shifting action of the automatic transmission 22 to the low or high gear position L, H, however, the torque received by the output shaft 14 is subject to an influence of the torque capacities of the first or second brake B1, B2 and a change of an inertia torque of the automatic transmission 22. Further, the torque received by the output shaft 14 is a positive torque during the torque generating operation of the MG2, and is a negative torque during the regenerative operation of the MG2. In the regenerative operation, the MG2 is driven by a rotary motion of the output shaft 14 transmitted through the automatic transmission 22, irrespective of whether the vehicle is in a driving state or in a non-driving state.

Figure 4:
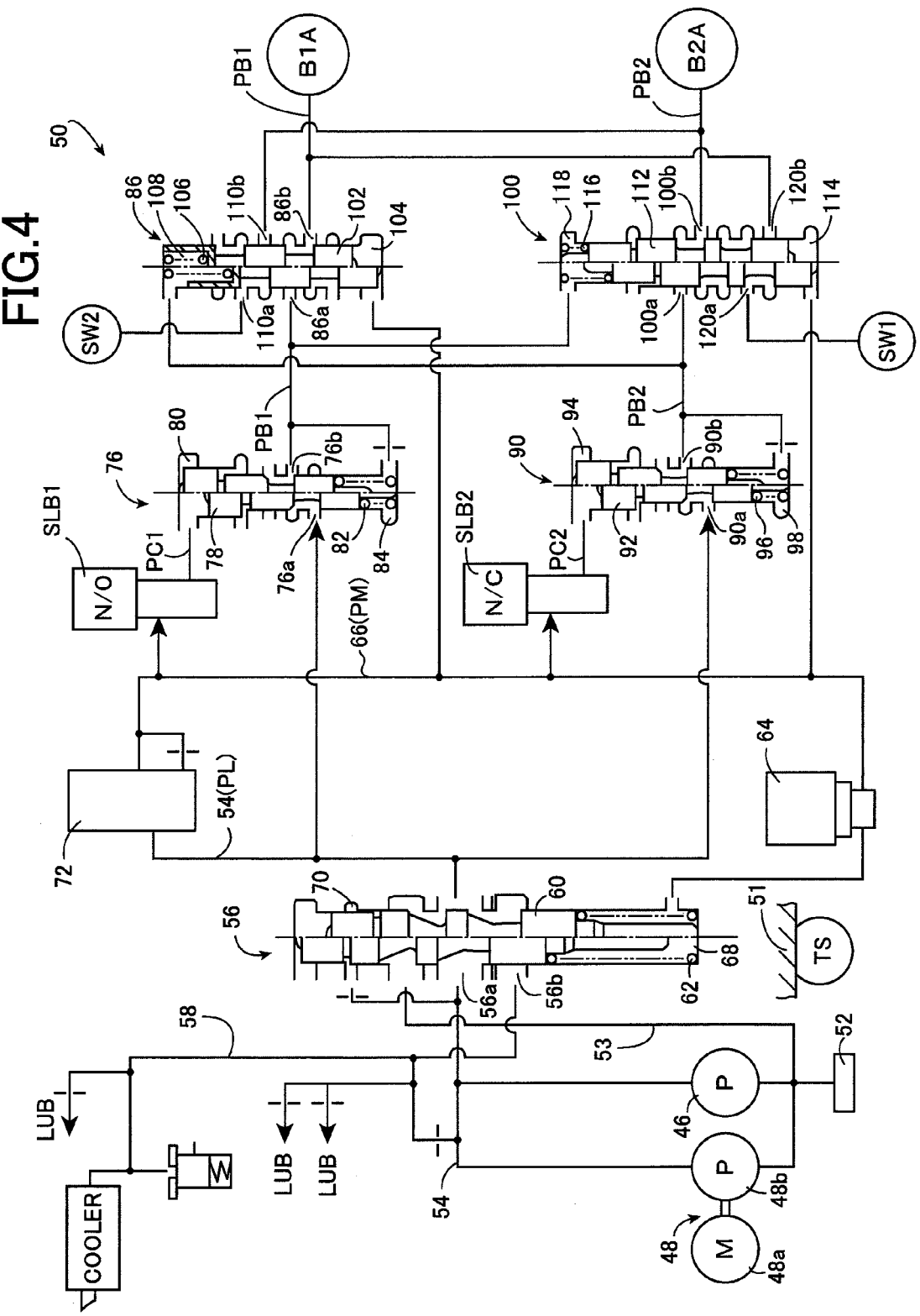
FIG. 4 is a hydraulic control circuit for automatically controlling shifting actions of the automatic transmission, by engaging and releasing actions of a first brake and a second brake.

Referring to FIG. 4, there is shown a hydraulic control circuit 50 for automatically controlling the shifting actions of the automatic transmission 22 by selective engaging and releasing actions of the first and second brakes B1, B2. This hydraulic control circuit 50 is provided with hydraulic pressure sources in the form of a mechanical oil pump 46 and an electric oil pump 48. The mechanical oil pump 46 is connected to a crankshaft 36 of the engine 24 and is driven by the engine 24. The electric oil pump 48 includes an electric motor 48a, and a pump 48b driven by the electric motor 48a. These mechanical and electric oil pumps 46, 48 are driven to suck the working oil through a strainer 52 from an oil pan (not shown), or directly from a return passage 53, and to pressurize the working fluid, so that the pressurized working oil is delivered to a line pressure passage 54. The above-indicated oil temperature sensor TS for detecting the temperature THoil of the working oil is build in a valve body 51 in which the hydraulic control circuit 50 is formed. However, the oil temperature sensor TS may be disposed in any other position.

A line-pressure regulating valve 56, which is a relief-type regulator valve, has a spool 60, a control pressure chamber 68, and a feedback pressure chamber 70. The spool 60 has an open position and a closed position for respectively permitting and inhibiting communication between a supply port 56a connected to a line pressure passage 54, and a discharge port 56b connected to a drain passage 58. The control pressure chamber 68 accommodates a spring 62 that generates a biasing force acting on the spool 60 in a direction toward its closed position, and receives a modulated pressure PM in a modulated-pressure passage 66 through a solenoid-operated shut-off valve 64, for raising a preset level of a line pressure PL. The feedback pressure chamber 70 is connected to the above-indicated line pressure passage 54, for generating a thrust force acting on the spool 60 in a direction toward its open position. The line-pressure regulating valve 56 generates one of two different levels of the line pressure PL. When the vehicle operator's required output of the vehicle as represented by the operation amount of the accelerator pedal is larger than a predetermined threshold, or when the automatic transmission 22 is in a shifting action or in the process of shifting, for example, the solenoid-operated shut-off valve 64 is switched from its closed state to its open state for applying the modulated pressure PM to the control pressure chamber 68, to increase the thrust force acting on the spool 60 in the direction toward the closed position by a predetermined amount, so that the line pressure PL is switched from the low level to the high level.

A modulated-pressure regulating valve 72 lowers the received line pressure PL into the predetermined modulated pressure PM lower than the line pressure PL, irrespective of a change of the line pressure PL. The modulated pressure PM is delivered to the modulated-pressure passage 66, and is applied to a first linear solenoid valve SLB1 provided to control the first brake B1, and a second liner solenoid valve SLB2 provided to control the second brake B2. The first and second linear solenoid valves SLB1, SLB2 generate respective control pressures PC1, PC2 corresponding to respective commanded drive current values ISOL1, ISOL2 received from the electronic transmission control device 44.

Figure 5:
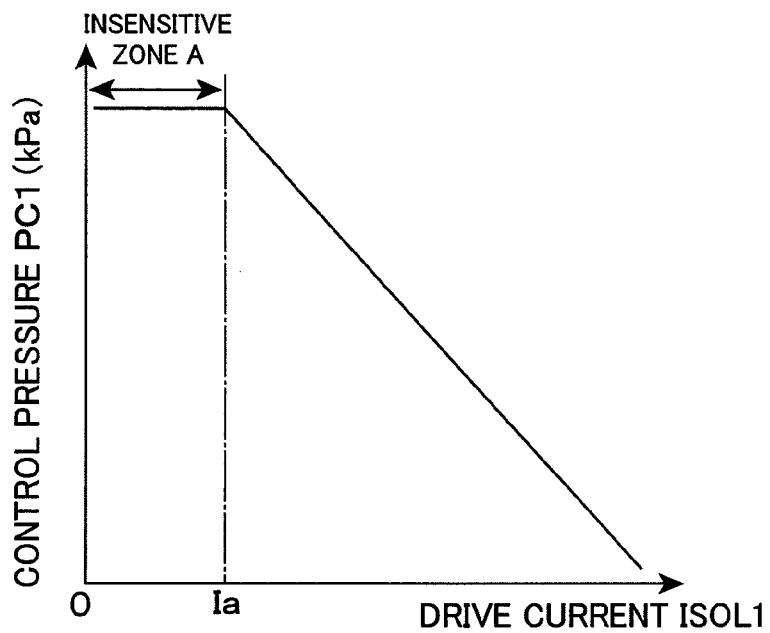
FIG. 5 is a view indicating operating characteristics of a first linear solenoid valve of a normally-open type, which is placed in an open state (in a communicating state) for permitting communication between an input port and an output port when the first linear solenoid valve is in a de-energized state.
Figure 6:
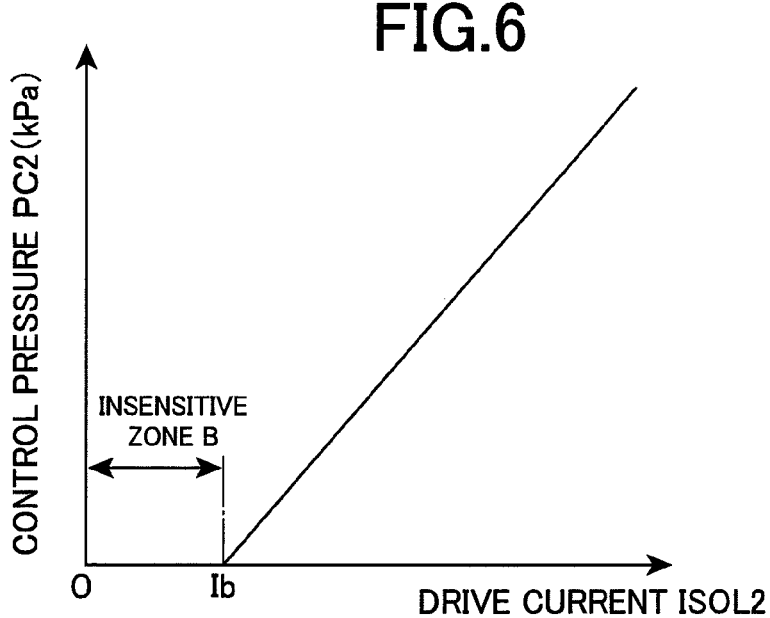
FIG. 6 is a view indicating operating characteristics of a second linear solenoid valve of a normally-closed type, which is placed in a closed state (in a non-communicating state) for inhibiting communication between an input port and an output port when the second linear solenoid valve is in a de-energized state.

The first linear solenoid valve SLB1 is a normally-open valve which is placed in an open position for permitting communication between its input and output ports when the valve is placed in a de-energized state. As indicated in FIG. 5, the control pressure PC1 generated by the first linear solenoid valve SLB1 decreases with an increase of the drive current value ISOL1. However, the first linear solenoid valve SLB1 has operating characteristics wherein there exists an insensitive zone A from 0 to a predetermined value Ia of the drive current ISOL1, in which the control pressure PC1 does not decrease with the increase of the drive current value ISOL1, as also indicated in FIG. 5. The second linear solenoid valve SLB2 is a normally-closed valve which is placed in a closed position for inhibiting communication between its input and output ports when the valve is placed in a de-energized state. As indicated in FIG. 6, the control pressure PC2 generated by the second linear solenoid valve SLB2 increases with an increase of the drive current value ISOL2. However, the second linear solenoid valve SLB2 has operating characteristics wherein there exists an insensitive zone B from 0 to a predetermined value Ib of the drive current ISOL2, in which the control pressure PC2 does not increase with the increase of the drive current value ISOL2, as also indicated in FIG. 6.

A B1 control valve 76 has a spool 78, a control pressure chamber 80, and a feedback pressure chamber 84. The spool 78 has an open position and a closed position for respectively permitting and inhibiting communication between an input port 76a connected to the line pressure passage 54, and an output port 76b for generating an engaging hydraulic pressure PB1 of the first brake B1. The control pressure chamber 80 receives the control pressure PC1 from the first linear solenoid valve SLB1, which acts on the spool 78 in a direction toward its open position. The feedback pressure chamber 84 accommodates a spring 82 that generates a biasing force acting on the spool 78 in a direction toward its closed position, and receives the engaging hydraulic pressure PB1 of the first brake B1. The B1 control valve 76 changes the line pressure PL received from the line pressure passage 54, into the engaging hydraulic pressure PB1 corresponding to the control pressure PC1 received from the first linear solenoid valve SBL1. The engaging hydraulic pressure PB1 is applied to the first brake B1 through a B1 apply control valve 86 that functions as an interlocking valve.

A B2 control valve 90 has a spool 92, a control pressure chamber 94, and a feedback pressure chamber 98. The spool 92 has an open position and a closed position for respectively permitting and inhibiting communication between an input port 90a connected to the line pressure passage 54, and an output port 90b for generating an engaging hydraulic pressure PB2 of the second brake B2. The control pressure chamber 94 receives the control pressure PC2 from the second linear solenoid valve SLB2, which acts on the spool 92 in a direction toward its open position. The feedback pressure chamber 98 accommodates a spring 96 that generates a biasing force acting on the spool 92 in a direction toward its closed position, and receives the engaging hydraulic pressure PB2 of the second brake B2. The B2 control valve 90 changes the line pressure PL received from the line pressure passage 54, into the engaging hydraulic pressure PB2 corresponding to the control pressure PC2 received from the second linear solenoid valve SBL2. The engaging hydraulic pressure PB2 is applied to the second brake B2 through a B2 apply control valve 100 that functions as an interlocking valve.

The B1 apply control valve 86 has a spool 102, a pressure chamber 104 and a pressure chamber 108. The spool 102 has an open position and a closed position for respectively permitting and inhibiting communication between an input port 86a receiving the engaging hydraulic pressure PB1 of the first brake B1 from the B1 control valve 76, and an output port 86b connected to the first brake B1. The pressure chamber 104 receives the modulated pressure PM, which acts on the spool 102 in a direction toward its open position, while the pressure chamber 108 accommodates a spring 106 generating a biasing force acting on the spool 102 in a direction toward its closed position, and receives the engaging hydraulic pressure PB2 of the second brake B2. The B1 apply control valve 86 is held in the open position until it receives the engaging hydraulic pressure PB2 for engaging the second brake B2, and is brought to its closed position upon reception of the engaging hydraulic pressure PB2, to prevent an engaging action of the first brake B1.

The B1 apply control valve 86 further has a pair of ports 110a, 110b which are closed when the spool 102 is placed in the open position (indicated in FIG. 4 on the right side of its centerline), and opened when the spool 102 is placed in the closed position (indicated in FIG. 4 on the left side of its centerline). The pressure switch SW2 for detecting the engaging hydraulic pressure PB2 of the second brake B2 is connected to the port 110a, while the second brake B2 is connected directly to the other port 110b. This pressure switch SW2 is placed in an on state when the engaging hydraulic pressure PB2 is higher than a predetermined level, and is placed in an off state when the engaging hydraulic pressure PB2 is not higher than the predetermined level. Since the pressure switch SW2 is connected to the second brake B2 through the B1 apply control valve 86, the pressure switch SW2 can detect not only an abnormality of the engaging hydraulic pressure PB2, but also abnormalities of hydraulic components associated with the first brake B1, such as abnormalities of the first linear solenoid valve SLB1, B1 control valve 76 and B1 apply control valve 86.

Like the B1 apply control valve 86, the B2 apply control valve 100 has a spool 112, a pressure chamber 114 and a pressure chamber 118. The spool 112 has an open position and a closed position for respectively permitting and inhibiting communication between an input port 100a receiving the engaging hydraulic pressure PB2 of the second brake B2 from the B2 control valve 90, and an output port 100b connected to the second brake B2. The pressure chamber 114 receives the modulated pressure PM, which acts on the spool 112 in a direction toward its open position, while the pressure chamber 118 accommodates a spring 116 generating a biasing force acting on the spool 112 in a direction toward its closed position, and receives the engaging hydraulic pressure PB1 of the first brake B1. The B2 apply control valve 100 is held in the open position until it receives the engaging hydraulic pressure PB1 for engaging the first brake B1, and is brought to its closed position upon reception of the engaging hydraulic pressure PB1, to prevent an engaging action of the second brake B2.

The B2 apply control valve 100 also has a pair of ports 120a, 120b which are closed when the spool 112 is placed in the open position (indicated in FIG. 4 on the right side of its centerline), and opened when the spool 112 is placed in the closed position (indicated in FIG. 4 on the left side of its centerline). The pressure switch SW1 for detecting the engaging hydraulic pressure PB1 of the first brake B1 is connected to the port 120a, while the first brake B1 is connected directly to the other port 120b. This pressure switch SW1 is placed in an on state when the engaging hydraulic pressure PB1 is higher than a predetermined level, and is placed in an off state when the engaging hydraulic pressure PB1 is not higher than the predetermined level. Since the pressure switch SW1 is connected to the first brake B1 through the B2 apply control valve 100, the pressure switch SW1 can detect not only an abnormality of the engaging hydraulic pressure PB1, but also abnormalities of hydraulic components associated with the second brake B2, such as abnormalities of the second linear solenoid valve SLB2, B2 control valve 90 and B2 apply control valve 100.

Referring to the table of FIG. 7 for explaining the hydraulic control circuit 50 configured as described above, a mark "O" indicates the energized or engaged state while a mark "X" indicates the de-energized or released state. That is, when the first linear solenoid valve SLB1 and the second linear solenoid valve SLB2 are both placed in the energized state, the first brake B1 is placed in the released state while the second brake B2 is placed in the engaged state, so that the automatic transmission portion 22 is placed in the low gear position L. When the first linear solenoid valve SLB1 and the second linear solenoid valve SLB2 are both placed in the released state, the first brake B1 is placed in the engaged state while the second brake B2 is placed in the released state, so that the automatic transmission portion 22 is placed in the high gear position H.

FIG. 8 is a functional block diagram for explaining major control functions of the electronic control devices 28, 34, 44. Hybrid drive control means 130 shown in FIG. 8 is enabled to operate when a power switch is operated with the brake pedal being depressed after insertion of a key into a key slot. The hybrid drive control means 130 calculates the vehicle operator's required vehicle output on the basis of the operation amount of the accelerator pedal, and controls the engine 24 and/or the MG2 to generate the vehicle operator's required vehicle output, with high fuel economy and a reduced amount of exhaust emissions. The hybrid drive control means 130 selects one of vehicle drive modes depending upon the running condition of the vehicle. For instance, the vehicle drive modes includes a motor drive mode in which only the MG2 is operated as the drive power source with the engine 24 held at rest, a charging drive mode in which the MG2 is operated as the drive power source while the engine 24 is operated to operate the MG1 as the electric generator, and an engine drive mode in which the engine 24 is operated to generate a vehicle drive force to be mechanically transmitted to the drive wheels 18.

The hybrid drive control means 130 controls the MG1 to control the operating speed Ne of the engine 24 such that the engine 24 operates along a highest fuel economy curve. When the MG2 is operated to provide an assisting torque, the hybrid drive control means 130 places the automatic transmission 22 in the low gear position L to increase the assisting torque to be added to the output shaft 14 while the vehicle speed V is relatively low. When the vehicle speed V is relatively high, the hybrid drive control means 130 places the automatic transmission 22 in the high gear position H to lower the MG2 speed Nmg2, for reducing a power loss. Thus, the hybrid drive control means 130 implements the assisting torque control so as to assure an efficient operation of the MG2 to provide the assisting torque. During a coasting run of the vehicle, the hybrid drive control means 130 controls the hybrid drive system such that the MG1 or MG2 is driven by a kinetic or inertial energy of the coasting vehicle, to convert the kinetic energy into an electric energy to be stored in the electric-energy storage device 32.

During a reverse running of the vehicle, the hybrid drive control means 130 places the automatic transmission 22 in the low gear position L, and operates the MG2 in the reverse direction. At this time, the MG1 of the first drive power source 12 is operated in a non-load state or to provide a minimum torque, to permit the output shaft 14 to be rotated in the reverse direction irrespective of the operating state of the engine 24.

A control operation of the hybrid drive control means 130 in the engine drive mode will be described in detail, by way of example. In the engine drive mode, the hybrid drive control means 130 operates the engine 24 in an efficiently operating state with high degrees of vehicle drivability and fuel economy, and optimizes the proportion of the drive forces generated by the engine 24 and MG2, and the reaction force generated during an operation of the MG1 as the electric generator.

For instance, the hybrid drive control means 130 determines a target drive force value, for example, a target output shaft torque TR, according to a stored drive force map and on the basis of the vehicle operator's required vehicle output as represented by the operation amount of the accelerator pedal and the vehicle running speed. The hybrid drive control means 130 then calculates a required output shaft power on the basis of the calculated target output shaft torque TR, while taking account of a required amount of charging of the electric-energy storage device, and calculates a target engine power so as to obtain the calculated required output shaft power, while taking account of the power transmission loss, loads acting on optionally installed devices, the assisting torque, and the selected gear position of the automatic transmission 22. The hybrid drive control means 130 controls the engine 24 and the amount of electric energy generated by the MG1, to provide the engine speed and torque for obtaining the calculated target engine power, such that the engine 24 operates along the highest fuel economy curve (represented by a stored fuel economy map or relationship) which is obtained by experimentation to provide a compromise between the vehicle drivability and the fuel economy and which is defined in a two-dimensional coordinate system in which the engine speed and torque are taken along respective two axes.

The hybrid drive control means 130 controls the inverters 30, 40 such that the electric energy generated by the MG1 is supplied to the electric-energy storage device 32 through the inverters 30, 40, so that a major portion of the drive force of the engine 24 is mechanically transmitted to the output shaft 14, while the rest of the drive force of the engine 22 is used to operate the MG1 as the electric generator for converting this mechanical energy into the electric energy, which is supplied to the MG2 through the inverters 30, 40, to operate the MG2 as the electric motor MG2 for generating a mechanical energy to be transmitted to the output shaft 14. Components associated with the generation of the electric energy by the MG1 and the consumption of the electric energy by the MG2 constitute an electric path through which the electric energy obtained by conversion of the major portion of the drive force of the engine 24 by the MG1 is supplied to the MG2 for conversion of the electric energy into the mechanical energy. The hybrid drive control means 130 permits the electric energy stored in the electric-energy storage device 32, as well as the electric energy generated by the MG1, to be supplied to the MG2 through the inverter 40, for operating the MG2.

The hybrid drive control means 130 is further configured to control the MG1 by utilizing the differential function of the planetary gear set 26, so as to hold the engine speed substantially constant or control the engine speed to a desired value, irrespective of whether the vehicle is stationary or running. In other words, the hybrid drive control means 130 makes it possible to control the operating speed of the MG1 to a desired value while holding the engine speed substantially constant or changing the engine speed to the desired value.

The hybrid drive control means 130 includes engine output control means functioning to command an engine-output control device (not shown) for controlling the engine 24, so as to provide a required output, by controlling a throttle actuator to open and close an electronic throttle valve, and controlling an amount and time of fuel injection by a fuel injecting device into the engine 24, and the timing of ignition of an igniter by an ignition device, alone or in combination.

Figure 9:
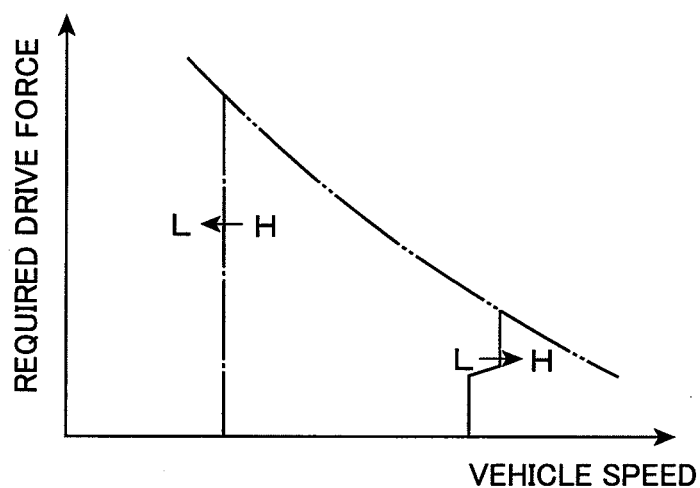
FIG. 9 is a view indicating a shifting boundary line map used by the electronic control device of FIG. 1 to control the shifting actions of the transmission.
Figure 10:
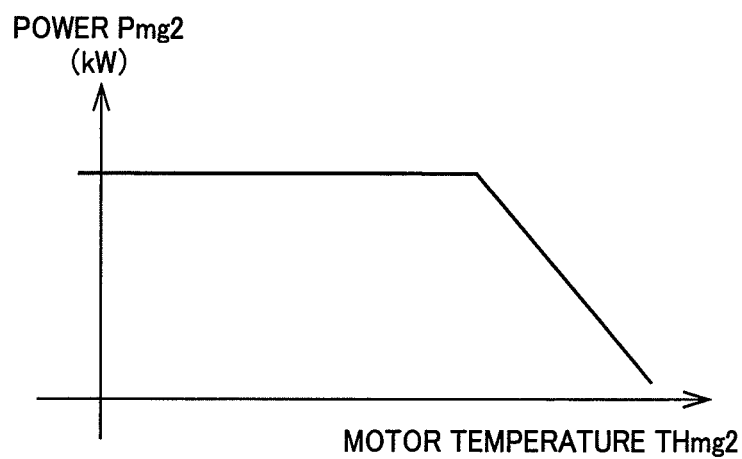
FIG. 10 is a view indicating an example of an electric motor output map of a second motor/generator MG2 obtained by experimentation, which electric motor output map defines a relationship between a temperature and a power of the second motor/generator MG2.

Shifting control means 132 is configured to determine a shifting action of the automatic transmission 22 on the basis of the vehicle speed V and the required vehicle drive force and according to shifting boundary lines (defined by a stored shifting boundary line map) indicated in FIG. 9 by way of example. For instance, the required vehicle drive force is determined by the hybrid drive control means 130 on the basis of the operation amount of the accelerator pedal and the vehicle speed, and according to a stored drive force map. The first brake B1 and second brake B2 are controlled according to the shifting action of the automatic transmission 22 determined by the shifting control means 132. In FIG. 9, solid line indicates a shift-up boundary line for shifting the automatic transmission 22 from the low gear position L to the high gear position H, while one-dot chain line indicates a shift-down boundary line for shifting the automatic transmission 22 from the high gear position H to the low gear position L. Thus, there is a predetermined hysteresis between the shift-up and shift-down boundary lines. The shift-up and shift-down boundary lines indicated by the solid and one-dot chain lines correspond to a predetermined rule for shifting the automatic transmission 22.

For example, the shifting control means 132 commands the hydraulic control circuit 50 to shift the automatic transmission 22 to the determined gear position, so that the hydraulic control circuit 50 controls the first and second linear solenoid valves SLB1, SLB2 according to commands received from the shifting control means 132, for placing the first and second brakes B1, B2 in the appropriate operating states.

During the shifting action of the automatic transmission 22 performed under the shifting control means 132, the hybrid drive control means 130 holds the electric energy consumption of the MG2, that is, the output of the MG2 (hereinafter referred to as "MG2 power") Pmg2 substantially constant, for equalizing an amount of charging and an amount of discharging of the electric-energy storage device 32, to thereby reduce the load of the electric-energy storage device 32. Namely, the hybrid drive control means 130 changes the torque of the MG2 (hereinafter referred to as "MG2 torque") Tmg2 according to a change of the operating speed of the MG2 due to the shifting action of the automatic transmission 22, for holding the MG2 power Pmg2 substantially constant. The MG2 power Pmg2 is determined by the MG2 torque Tmg2 and the MG2 speed Nmg2, that is, equal to a product of the MG2 torque Tmg2 and the MG2 speed Nmg2. Thus, a so-called "iso-power shifting control" of the automatic transmission 22 is implemented during the shifting action while the MG2 power Pmg2 is held substantially constant.

It is noted that the maximum output of the MG2 that can be obtained changes depending upon the MG2 temperature THmg2. Therefore, the MG2 power Pmg2 should be limited depending upon the MG2 temperature THmg2. In other words, it is required to limit the MG2 power Pmg2 within a range of the maximum output.

Motor-output limitation determining means 134 is configured to determine whether it is required to implement the output limitation of the MG2. For example, the motor-output limitation determining means 134 calculates the maximum MG2 power Pmg2 on the basis of the actual MG2 temperature THmg2, and according to a predetermined relationship between the MG2 power Pmg2 (for torque generation or electric energy generation) and the MG2 temperature THmg2, which is obtained by experimentation. This relationship is represented by a stored motor output map. The motor-output limitation determining means 134 compares the calculated maximum MG2 power Pmg2 with a predetermined threshold Pmg2$th$, and determines that the limitation of the output of the MG2 is required, if the calculated maximum MG2 power Pmg2 is equal to or lower than the threshold Pmg2$th$.

When the motor-output limitation determining means 134 determines that it is required to limit the output of the MG2, the hybrid drive control means 130 descried above functions as motor-output limitation control means for limiting the output of the MG2 on the basis of the calculated maximum MG2 power Pmg2. For example, the hybrid drive control means 130 limits the output of the MG2 by limiting the torque Tmg2 of the MG2.

Figure 14:
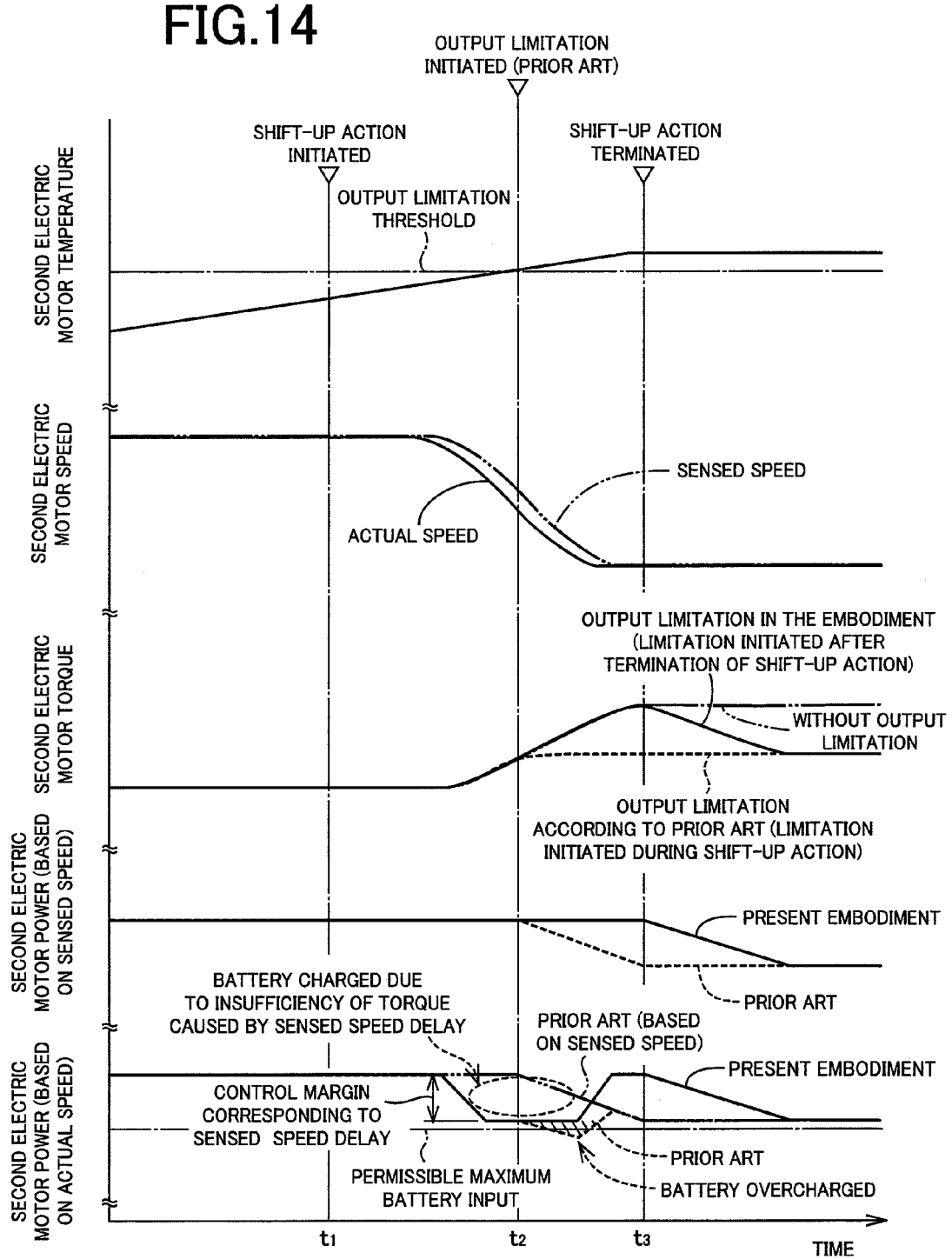
FIG. 14 is a time chart for explaining an example of a control operation performed according to the control routine of the flow chart of FIG. 13, when it is required to limit the output of the second motor/generator MG2 during the shift-up action of the automatic transmission.

An output signal of the MG2 speed sensor 43 is processed by a filter to remove mechanical and electric noises, and the MG2 speed Nmg2 is represented by the processed output signal of the MG2 speed sensor 43. Accordingly, a change of the sensed speed of the MG2 as detected by the MG2 speed sensor 43 is delayed with respect to a change of the actual speed of the MG2. During the shift-up action of the automatic transmission 22, for instance, the actual speed of the MG2 is lowered. In this case, a drop of the sensed speed is delayed with respect to a drop of the actual speed of the MG2, so that the sensed speed is always higher than the actual speed (as indicated in FIG. 14).

During the iso-power shift-up action of the automatic transmission 22, therefore, the MG2 torque Tmg2 is increased to hold the MG2 power Pmg2 substantially constant, on the basis of the sensed speed of the MG2 the drop of which is delayed with respect to the drop of the actual speed. Accordingly, the increase of the MG2 torque Tmg2 is delayed, so that the MG2 torque Tmg2 generated by the MG2 is made smaller than a target value required to hold the MG2 power Pmg2 substantially constant, whereby the actual MG2 power Pmg2 (MG2 torque Tmg2 based on the sensed speed of the MG2×actual speed) is made smaller than the iso-power value. Therefore, a difference of the actual MG2 power Pmg2 from the iso-power value is stored in the electric-energy storage device 32, for equalizing the amount of electric energy generated by the MG1 with the amount of electric energy supplied to the electric-energy storage device 32 and the MG2. In this case, the electric-energy storage device 32 is charged. That is, the iso-power value of the MG2 power Pmg2 is maintained according to the sensed speed of the MG2, but the electric-energy storage device 32 is charged due to insufficiency of the MG2 torque Tmg2 caused by the sensed speed delay with respect to the actual speed.

It is noted that the amounts of electric energy (electric power) Win and Wout that can be stored into and discharged from the electric-energy storage device 32 (hereinafter referred to as "permissible maximum charging and discharging amounts") vary depending upon the temperature THbat and the charging capacity SOC of the electric-energy storage device 32. That is, an input limit value Win and an output limit value Wout (hereinafter collectively referred to as "input and output limit values Win, Wout") vary depending upon the temperature THbat and the charging capacity SOC. To prevent deterioration of the durability of the electric-energy storage device 32, these input and output limit values Win, Wout must be followed.

Figure 11:
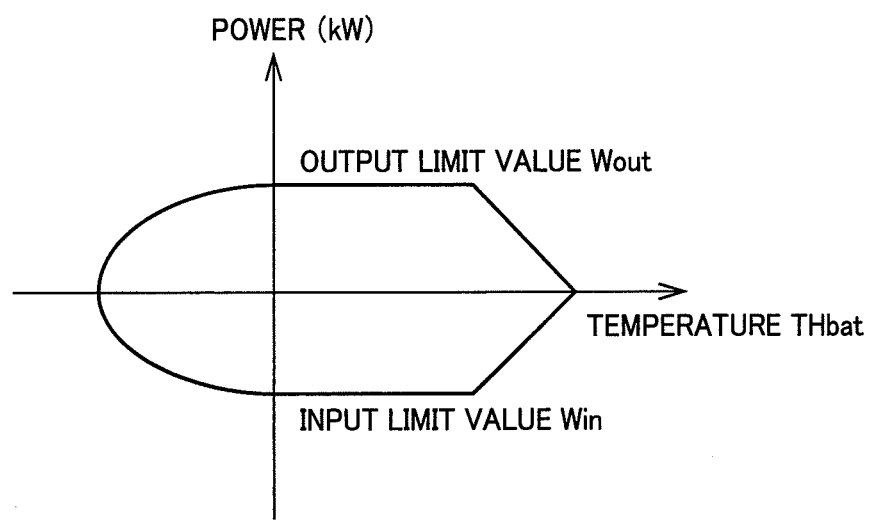
FIG. 11 is a view indicating an example of an input/output limiting map of an electric-energy storage device obtained by experimentation, which input/output limiting map defines relationships between a temperature and input and output limit values of the electric-energy storage device.
Figure 12:
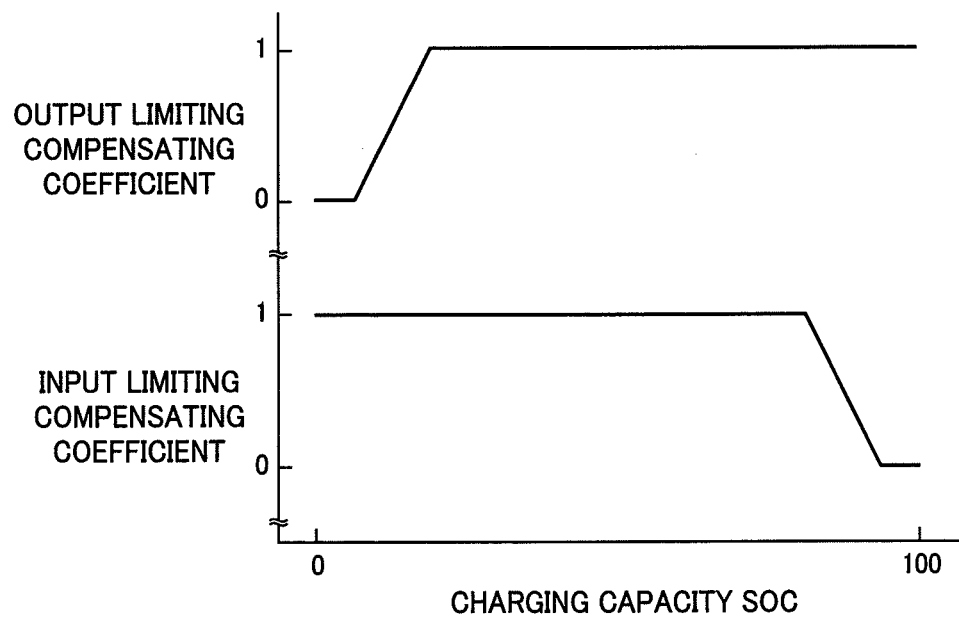
FIG. 12 is a view indicating an example of an input/output limiting compensation coefficient map obtained by experimentation, which compensation coefficient map defines relationships between a charging capacity and the input and output limit values of the electric-energy storage device.

FIG. 11 indicates relationships between the temperature THbat and the input and output limit values Win, Wout (input/output limiting map), which are obtained by experimentation, and FIG. 12 indicates relationships between the charging capacity SOC and the input and output limit values Win, Wout (an input/output limiting compensation coefficient map), which are obtained by experimentation. Basic values of the input and output limits Win and Wout are determined on the basis of the temperature THbat and according to the input and output limiting map of FIG. 11, while an input limiting compensation coefficient and an output limiting compensating coefficient are determined on the basis of the charging capacity SOC and according to the input/output limiting compensation coefficient map of FIG. 12. The input and output limit values Win and Wout are obtained by multiplying the determined basic values by the determined input and output limiting compensation coefficients, respectively.

There is a risk of a problem that the above-indicated input limit value (charging limit value) Win cannot be followed when the electric-energy storage device 32 is charged during the shift-up action of the automatic transmission 22. To reduce this risk, the present embodiment is arranged to provide a control margin of the actual speed of the MG2, which control margin corresponds to the above-indicated sensed speed delay.

When the output limitation of the MG2 and the shift-up action of the automatic transmission 22, both of which result in reduction of the MG2 power Pmg2 and the amount of electric energy consumption, are implemented concurrently, the control margin corresponding to the sensed speed delay may be insufficient, giving rise to a possibility of overcharging of the electric-energy storage device 32 beyond the charging limit (input limit value).

In view of the above, the present embodiment is configured to inhibit the output limitation of the MG2 by the hybrid drive control means 130 during the shift-up action of the automatic transmission 22 under the control of the shifting control means 132, to permit a sufficient operation of the MG2 for electric energy consumption sufficient to reduce the possibility of overcharging of the electric-energy storage device 32, even in an operating environment in which the sensed speed delay takes place due to the shift-up action of the automatic transmission 22.

Where the output limitation of the MG2 is initiated before initiation of the shift-up action of the automatic transmission 22, it is considered that there is a high necessity for protecting the MG2. It is also noted that the absolute amount of the MG2 torque Tmg2 during the shift-up action of the automatic transmission 22 is relatively small, and the amount of reduction of the MG2 power Pmg2 with respect to the iso-power value due to the sensed speed delay during the shift-up action (namely, an amount of input to the electric-energy storage device 32) is relatively small. Therefore, the output limitation of the MG2 is less likely to have an adverse influence on the electric-energy storage device 32, even if the output limitation is not inhibited. Thus, where the output limitation of the MG2 is initiated by the hybrid drive control means 130 before initiation of the shift-up action of the automatic transmission 22 under the control of the shifting control means 132, the output limitation of the MG2 for the purpose of protecting the MG2 need not be inhibited, but is continued.

Where the output limitation of the MG2 is initiated after initiation of the shift-up action, on the other hand, the amount of reduction of the MG2 power Pmg2 with respect to the iso-power value due to the sensed speed delay is made relatively large, and the output limitation is likely to have an adverse influence on the electric-energy storage device 32. Further, it is considered that the necessity for rapidly protecting the MG2 is not so high, and that the output limitation of the MG2 may be delayed until the shift-up action is terminated. In this respect, the output limitation of the MG2 is inhibited not for protecting the MG2, but for protecting the electric-energy storage device 32. Thus, either the MG2 or the electric-energy storage device 32 is protected depending upon the situation, for sufficient protection of the MG2 and electric-energy storage device 32.

Described in greater detail, shift-up action determining means 136 is provided to determine whether the automatic transmission 22 is in the shift-up action or not. This determination is made by determining whether a shifting command to shift up the automatic transmission 22 from the low gear position L to the high gear position H has been generated by the shifting control means 132, on the basis of the vehicle speed V and the required vehicle drive force and according to the shifting boundary line map of FIG. 9. This shift-up action determining means 136 also functions to determine whether the automatic transmission 22 is in an initial portion of the shift-up action.

When the motor-output limitation determining means 134 determines that it is required to limit the output of the MG2 while the shift-up action determining means 136 determines that the automatic transmission 22 is not in the shift-up action, the hybrid drive control means 130 implements the output limitation of the MG2. In this case, the hybrid drive control means 130 turns on a PRE-SHIFTING MOTOR-OUTPUT LIMITATION flag. While the output limitation of the MG2 is not implemented, the PRE-SHIFTING MOTOR-OUTPUT LIMITATION flag is kept in an off state.

Output-limitation flag determining means 140 is provided to determine whether the PRE-SHIFTING MOTOR-OUTPUT LIMITATION flag is placed in the off state.

Motor-output limitation inhibiting means 138 commands the hybrid drive control means 130 to inhibit the output limitation of the MG2 when the output-limitation flag determining means 140 determines that the PRE-SHIFTING MOTOR-OUTPUT LIMITATION flag is placed in the off state and when the motor-output limitation determining means 134 determines that it is required to limit the output of the MG2 while the shift-up action determining means 136 determines that the automatic transmission 22 is in the shift-up action. Accordingly, the output limitation of the MG2 is not implemented even if the output limitation is required. In this case, the motor-output limitation inhibiting means 138 turns on a MOTOR-OUTPUT LIMITATION INHIBITING HYSTERESIS flag. This MOTOR-OUTPUT LIMITATION INHIBITING HYSTERESIS flag is once placed in an off state by the motor-output limitation inhibiting means 138, when the shift-up action determining means 136 has determined that the automatic transmission 22 is in the initial portion of the shift-up action.

The motor-output limitation inhibiting means 138 does not command the hybrid drive control means 130 to inhibit the output limitation of the MG2 when the output-limitation flag determining means 140 determines that the PRE-SHIFTING MOTOR-OUTPUT LIMITATION flag is placed in the on state and when the motor-output limitation determining means 134 determines that it is required to limit the output of the MG2 while the shift-up action determining means 136 determines that the automatic transmission 22 is in the shift-up action. In this case, the motor-output limitation inhibiting means 138 turns off the MOTOR-OUTPUT LIMITATION INHIBITING HYSTERESIS flag.

Output-limitation inhibiting hysteresis determining means 142 is provided to determine whether the MOTOR-OUTPUT LIMITATION INHIBITING HYSTERESIS flag is in the on state.

The motor-output limitation inhibiting means 138 cancels the command to inhibit the output limitation of the MG2, and performs a processing operation to restore the output limitation of the MG2, when the output-limitation inhibiting hysteresis determining means 142 determines that the MOTOR-OUTPUT LIMITATION INHIBITING HYSTERESIS flag is in the on state while the shift-up action determining means 136 determines that the automatic transmission 22 is not in the shift-up action. In this case, the motor-output limitation inhibiting means 138 places the MOTOR-OUTPUT LIMITATION INHIBITING HYSTERESIS flag in the off state.

Figure 13:
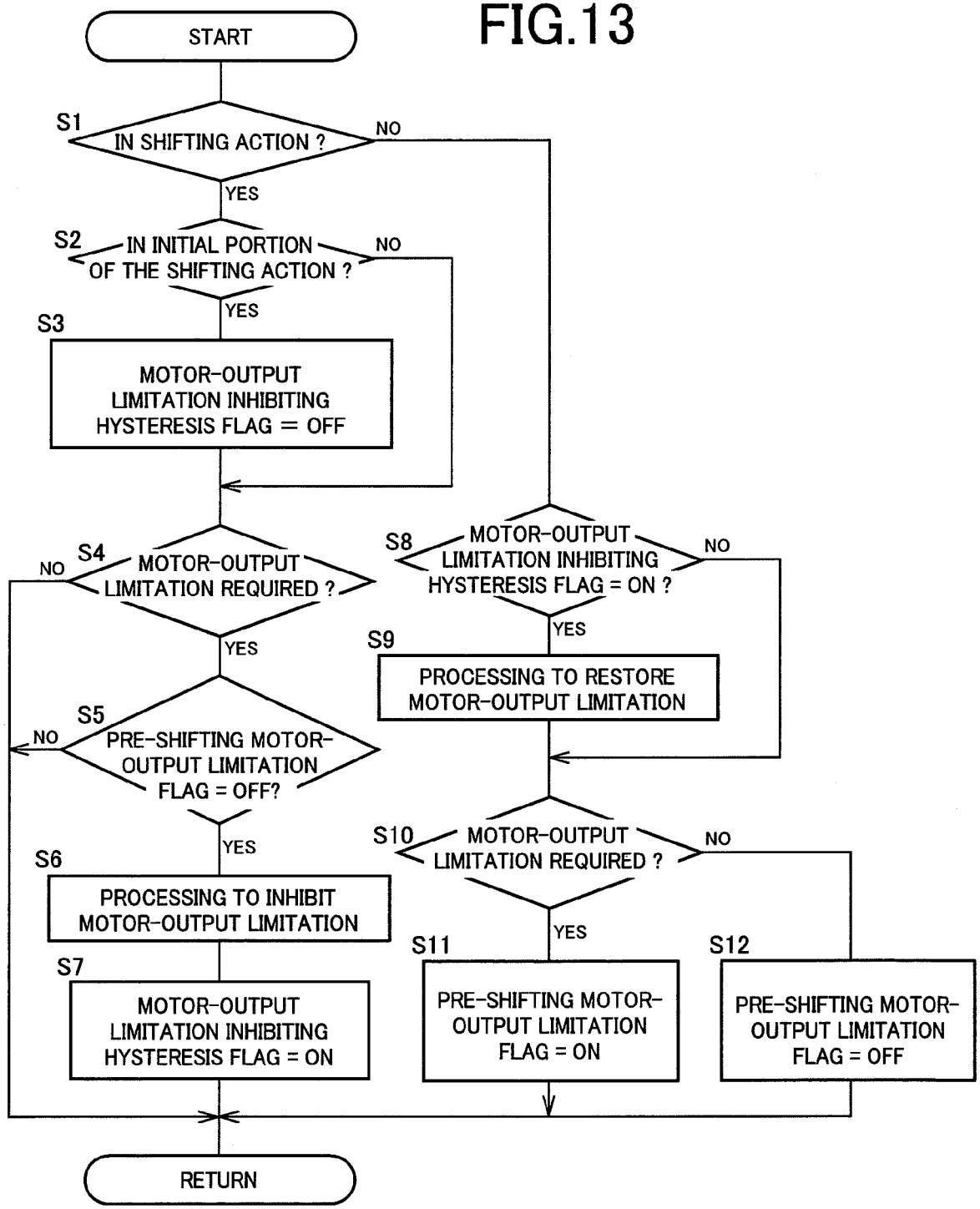
FIG. 13 is a flow chart illustrating major control functions of the electronic control devices of FIG. 1, that is, a control routine executed to assure sufficient protection of the electric-energy storage device even in an operating environment of the hybrid drive system involving a sensed speed delay of the second motor/generator during a shift-up action of the automatic transmission.

The flow chart of FIG. 13 illustrates major control functions of the electronic control devices 28, 34, 44 of FIG. 1, that is, a control routine to assure sufficient protection of the electric-energy storage device 32 even in the operating environment of the hybrid drive system involving the above-indicated sensed speed delay of the MG2 during the shift-up action of the automatic transmission 22. This control routine is repeatedly executed with an extremely short cycle time of from several milliseconds to several tens of milliseconds. The time chart of FIG. 14 explains an example of a control operation performed according to the control routine of the flow chart of FIG. 13, when it is required to limit the output of the MG2 during the shift-up action of the automatic transmission 22.

The control routine is initiated with step S1 (hereinafter "step" being omitted) corresponding to the shift-up action determining means 136, to determine whether the automatic transmission 22 is in the shift-up action.

If an affirmative determination is obtained in S1, the control flow goes to S2 corresponding to the shift-up action determining means 136, to determine whether the automatic transmission 22 is in an initial portion of the shift-up action.

If an affirmative determination is obtained in S2, the control flow goes to S3 corresponding to the motor-output limitation inhibiting means 138, to turn off the MOTOR-OUTPUT LIMITATION INHIBITING HYSTERESIS flag.

If a negative determination is obtained in S2, or after S3 is implemented, the control flow goes to S4 corresponding to the motor-output limitation determining means 134, to determine whether it is required to limit the output of the MG2 during the shift-up action.

If a negative determination is obtained in S4, one cycle of execution of the present control routine is terminated. If an affirmative determination is obtained in S4, the control flow goes to S5 corresponding to the output-limitation flag determining means 140, to determine whether the PRE-SHIFTING MOTOR-OUTPUT LIMITATION flag is placed in the off state.

If an affirmative determination is obtained in S5, the control flow goes to S6 corresponding to the motor-output limitation inhibiting means 138, to generate the command for inhibiting the output limitation of the MG2 according to the requirement for the output limitation, so that the output limitation will not be implemented even if the output limitation is required.

S6 is followed by S7 corresponding to the motor-output limitation inhibiting means 138, to turn on the MOTOR-OUTPUT LIMITATION INHIBITING HYSTERESIS flag.

If a negative determination is obtained in S5, one cycle of execution of the present control routine is terminated, so that the output limitation of the MG2 is implemented without generation of the command for inhibiting the output limitation.

If a negative determination is obtained in S1, the control flow goes to S8 corresponding to the output-limitation inhibiting hysteresis determining means 142, to determine whether the MOTOR-OUTPUT LIMITATION INHIBITING HYSTERESIS flag is placed in the on state.

If an affirmative determination is obtained in S8, the control flow goes to S9 corresponding to the motor-output limitation inhibiting means 138, to cancel the command generated in S6 for inhibiting the output limitation of the MG2, so that the output limitation can be implemented if it is required to limit the output of the MG2. In this case, the MOTOR-OUTPUT LIMITATION INHIBITING HYSTERESIS flag is turned off.

If a negative determination is obtained in S8, or after S9 is implemented, the control flow goes to S10 corresponding to the motor-output limitation determining means 134, to determine whether it is required to limit the output of the MG2.

If an affirmative determination is obtained in S10, the control flow goes to S11 corresponding to the hybrid drive control means 130, to implement the output limitation of the MG2, and turns on the PRE-SHIFTING MOTOR-OUTPUT LIMITATION flag.

If a negative determination is obtained in S10, the control flow goes to S12 corresponding to the hybrid drive control means 130, in which the output limitation of the MG2 is not implemented, and the PRE-SHIFTING MOTOR-OUTPUT LIMITATION flag is turned off.

In the time chart of FIG. 14, the shift-up action is initiated at a point of time t1. During the shift-up action, the MG2 speed Nmg2 is reduced. A drop of the sensed MG2 speed (indicated by two-dot chain line) is delayed with respect to a drop of the actual MG2 speed (indicated by solid line), so that the iso-power value of the MG2 power Pmg2 is maintained according to the sensed speed of the MG2, but the electric-energy storage device 32 is charged due to insufficiency of the MG2 torque Tmg2 caused by the sensed speed delay with respect to the actual speed. Thus, there is a risk of a problem that the input limit value Win (permissible maximum energy input to the electric-energy storage device 32) is not followed. To reduce this risk, the control margin which corresponds to the above-indicated sensed speed delay is provided to control the actual speed of the MG2.

When the output of the MG2 is limited by limiting the MG2 torque Tmg2 as indicated by broken line according to the requirement for the output limitation of the MG2 as a result of a rise of the MG2 temperature THmg2 at a point of time t2, this output limitation together with the insufficiency of the MG2 torque Tmg2 due to the sensed speed delay may give rise to a possibility of overcharging of the electric-energy storage device 32 with the energy input exceeding the input limit value (permissible maximum energy input), as indicated by broken line according to the prior art. Therefore, the present embodiment is arranged to inhibit the output limitation of the MG2 during the shift-up action, as indicated by solid line, even if it is required to limit the output of the MG2, and to initiate the output limitation of the MG2 at a point of time t3 at which the shift-up action is terminated. Accordingly, the insufficiency of the MG2 torque Tmg2 according to the actual MG2 speed is reduced to prevent or reduce the risk of overcharging of the electric-energy storage device 32 with the energy input exceeding the input limit value (permissible maximum energy input), as indicated by solid line.

According to the present embodiment described above, the output limitation of the MG2 by the hybrid drive control means 130 (motor-output limitation control means) according to the requirement for the output limitation is inhibited during the shift-up action of the automatic transmission 22, so that the MG2 is operated for a sufficient amount of electric energy consumption even in the operating environment involving the sensed speed delay due to the shift-up action of the automatic transmission 22, whereby it is possible to reduce a risk of excessive charging of the electric-energy storage device 32, for sufficient protection of the electric-energy storage device 32.

The present embodiment is further arranged not to inhibit the output limitation of the MG2 by the hybrid drive control means 130, if the output limitation is initiated before initiation of the shift-up action of the automatic transmission 22. Accordingly, the MG2 can be protected.

Namely, where the output limitation of the MG2 is initiated before initiation of the shift-up action, it is considered that there is a high necessity for protecting the MG2. It is also noted that the absolute amount of the MG2 torque Tmg2 during the shift-up action of the automatic transmission 22 is relatively small, so that the output limitation of the MG2 is less likely to have an adverse influence on the electric-energy storage device 32, even if the output limitation is not inhibited. In this case, therefore, the output limitation of the MG2 for the purpose of protecting the MG2 need not be inhibited, but is continued. Where the output limitation of the MG2 is initiated after initiation of the shift-up action, on the other hand, the sensed speed delay is likely to have an adverse influence on the electric-energy storage device 32. Further, the output limitation of the MG2 may be delayed until the shift-up action is terminated. In this respect, the output limitation of the MG2 is inhibited for protecting the electric-energy storage device 32. Thus, either the MG2 or the electric-energy storage device 32 is protected depending upon the situation, for sufficient protection of the MG2 and electric-energy storage device 32.

The present embodiment is further configured to make the determination as to whether it is required to implement the output limitation of the MG2, on the basis of a rise of the MG2 temperature THmg2. Accordingly, the output limitation of the MG2 for protecting the MG2 can be adequately implemented by the hybrid drive control means 130.

While the preferred embodiment of this invention has been described above in detail by reference to the drawings, it is to be understood that the invention may be otherwise embodied.

Figure 15:
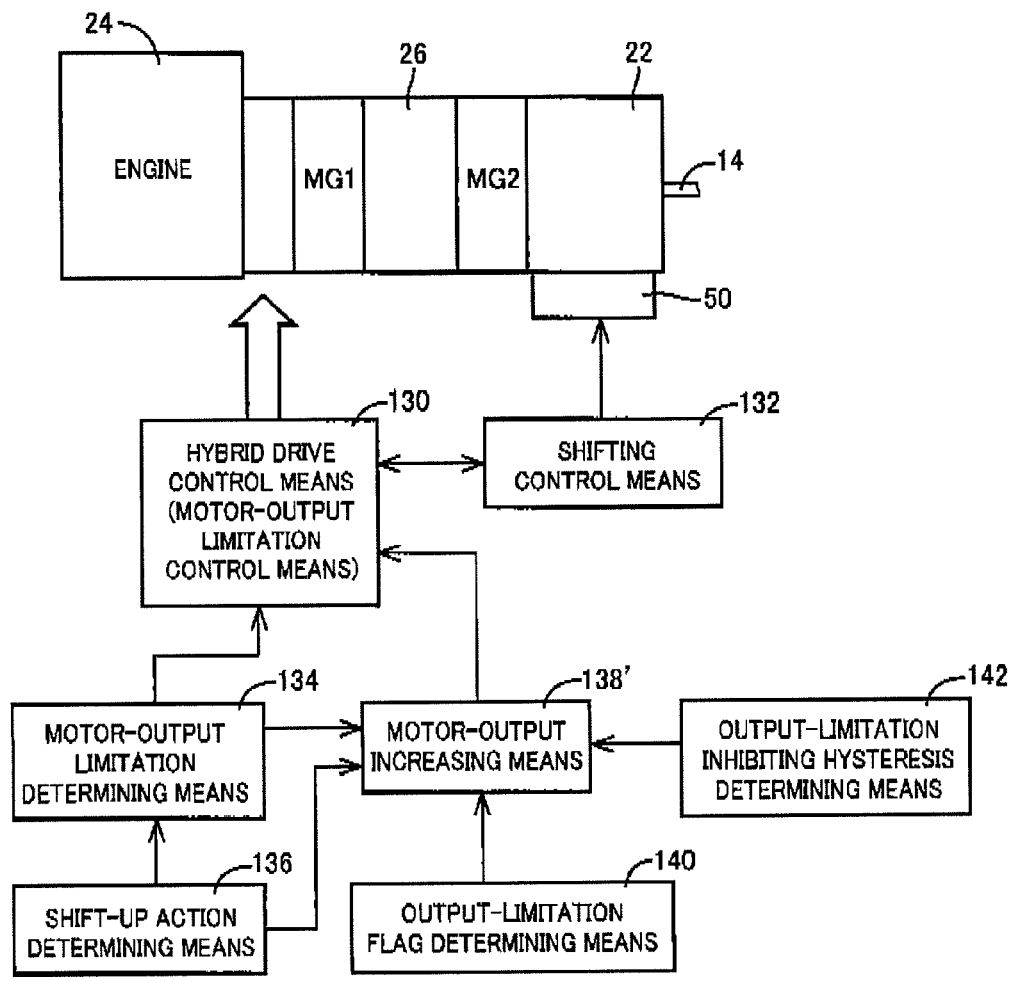
FIG. 15 is a functional block diagram for explaining major control functions of electronic control devices shown in FIG. 1, and represents another embodiment of the functional block diagram corresponding to that shown in FIG. 8.

In the illustrated embodiment, the output limitation of the MG2 according to the requirement for the output limitation is inhibited during the shift-up action of the automatic transmission 22, the inhibition of the output limitation of the MG2 may be replaced by a control of the MG2 to increase its output so as to offset the output limitation implemented by the hybrid drive control means 130 according to a requirement for the output limitation during the shift-up action of the automatic transmission 22. In this case, the MG2 is commanded in S6 of the flow chart of FIG. 13, to increase its torque so as to offset the output limitation of the MG2, rather than to inhibit the output limitation of the MG2. This modification also assures an operation of the MG2 for a sufficient amount of electric energy consumption even in the operating environment involving the sensed speed delay due to the shift-up action of the automatic transmission 22, whereby it is possible to reduce the risk of excessive charging of the electric-energy storage device 32, for sufficient protection of the electric-energy storage device 32. In this modification, the motor-output limitation inhibiting means 138 is replaced by motor-output increasing means 138', as shown in FIG. 15.

In the modification described above, the control apparatus controls the MG2 to increase its output so as to offset the output limitation of the MG2, rather than inhibits the output limitation. However, the control apparatus controls the MG2 so as not to increase its output so as to offset the output limitation of the MG2, if the output limitation by the hybrid drive control means 130 is initiated before initiation of the shift-up action of the automatic transmission 22. Eventually, the output of the MG2 is limited, so that the MG2 can be protected.

In the illustrated embodiment, the determination by the motor-output limitation determining means 134 as to whether it is required to implement the output limitation of the MG2 is made on the basis of a rise of the MG2 temperature THmg2. However, the determination by the motor-output limitation determining means 134 as to whether the output limitation of the MG2 is required may be made on the basis of a rise of the temperature THoil of the working fluid for the automatic transmission 22, which working fluid is also used for lubricating and cooling the MG2, or alternatively on the basis of a rise of a temperature of a component associated with the MG2, such as the inverters 30, 40, or a rise of a temperature of a coolant used for the inverters 30, 40. Further, the rise of the temperature THoil, the temperature of the component or the temperature of the coolant may be used in addition to the rise of the MG2 temperature THmg2, for making the above-indicated determination. This modification also permits the hybrid drive control means 130 to adequately implement the output limitation of the MG2 for protecting the MG2.

In the illustrated embodiment, the automatic transmission 22 is an automatic transmission (speed reducing device) which is disposed between the MG2 and the output shaft 14 and which has the two gear positions in the form of the high gear position H and the low gear position L for increasing the output torque of the MG2 and transmitting the thus increased torque to the output shaft 14. However, this automatic transmission 22 may be replaced by other types of transmission, such as a step-variable automatic transmission which is disposed between the MG2 and the output shaft 14, to transmit the output torque of the MG2 to the output shaft 14, for example, a multi-step planetary gear type transmission having three or more gear positions, or a step-variable transmission functioning as a speed-increasing device having gear positions some or all of which permit reduction of the output torque of the MG2 for transmitting the thus reduced torque to the output shaft 14. Alternatively, the automatic transmission 22 may be replaced by a well-known step-variable or multi-step planetary gear type transmission arranged to transmit the output of the engine 24 to the drive wheels 18.

It is to be understood that the preferred embodiment of this invention has been described for illustrative purpose only, and that the present invention may be embodied with various changes and improvements which may occur to those skilled in the art.

The invention claimed is:

1. A control apparatus for a hybrid drive system including a main drive power source, an electric generator, a wheel-side output shaft, an automatic transmission, a power distributing mechanism having an input element connected to the main drive power source in a drive-power transmissive state, a reaction element connected to the electric generator in the drive-power transmissive state and an output element connected to the wheel-side output shaft in the drive-power transmissive state, a control unit of the control apparatus controlling an operating state of the electric generator so as to control a differential state between each rotational speed of the input element, the reaction element and the output element, and an electric motor connected to the wheel-side output shaft through the automatic transmission, the control unit controlling a shifting action of the automatic transmission so as to raise or lower a rotational speed of the electric motor and transmit a rotation of the electric motor to the wheel-side output shaft, the hybrid drive system utilizing a differential function of the power distributing mechanism so that one portion of an output of a drive force of the main drive power source is mechanically transmitted to the wheel-side output shaft, while another portion of the output of the drive force of the main drive power source is converted into an electric energy by the electric generator and transmitted from the electric generator to the electric motor, the control apparatus comprising:
   motor-output limitation control means for implementing an output limitation of said electric motor according to a requirement for the output limitation; and
   motor-output limitation inhibiting means for inhibiting the output limitation of said electric motor by said motor-output limitation control means, during a shift-up action of said automatic transmission.

2. The control apparatus according to claim 1, wherein said motor-output limitation inhibiting means does not inhibit the output limitation of the electric motor by said motor-output limitation control means, if said output limitation is initiated before initiation of the shift-up action of said automatic transmission.

3. The control apparatus according to claim 1, which makes a determination as to whether it is required to implement the output limitation of the electric motor, on the basis of a rise of a temperature of the electric motor.

4. The control apparatus according to claim 1, further comprising motor-output limitation determining means for making a determination as to whether it is required to implement the output limitation of the electric motor, on the basis of a rise of a temperature of a lubricant used for cooling the electric motor.

5. The control apparatus according to claim 1, further comprising motor-output limitation determining means for making a determination as to whether it is required to implement the output limitation of the electric motor, on the basis of a rise of a temperature of a component associated with the electric motor.

6. A control apparatus for a hybrid drive system including a main drive power source, an electric generator, a wheel-side output shaft, an automatic transmission, a power distributing mechanism having an input element connected to the main drive power source in a drive-power transmissive state, a reaction element connected to the electric generator in the drive-power transmissive state and an output element connected to the wheel-side output shaft in the drive-power transmissive state, a control unit of the control apparatus controlling an operating state of the electric generator so as to control a differential state between each rotational speed of the input element, the reaction element and the output element, and an electric motor connected to the wheel-side output shaft through the automatic transmission, the control unit controlling a shifting action of the automatic so as to raise or lower a rotational speed of the electric motor and transmit a rotation of the electric motor to the wheel-side output shaft, the hybrid drive system utilizing a differential function of the power distributing mechanism so that one portion of an output of a drive force of the main drive power source is mechanically transmitted to the wheel-side output shaft, while another portion of the output of the drive force of the main drive power source is converted into an electric energy by the electric generator and transmitted from the electric generator to the electric motor, the control apparatus comprising:

motor-output limitation control means for implementing an output limitation of said electric motor according to a requirement for the output limitation; and motor-output increasing means for controlling said electric motor to increase its output so as to offset the output limitation of the electric motor implemented by said motor-output limitation control means according to a requirement for said output limitation during a shift-up action of said automatic transmission.

7. The control apparatus according to claim 6, wherein said motor-output increasing means does not control the electric motor so as to offset the output limitation by said motor-output limitation control means, if said output limitation is initiated before initiation of the shift-up action of said automatic transmission.

8. The control apparatus according to claim 6, further comprising motor-output limitation determining means for making a determination as to whether it is required to implement the output limitation of the electric motor, on the basis of a rise of a temperature of the electric motor.

9. The control apparatus according to claim 6, further comprising motor-output limitation determining means for making a determination as to whether it is required to implement the output limitation of the electric motor, on the basis of a rise of a temperature of a lubricant used for cooling the electric motor.

10. The control apparatus according to claim 6, further comprising motor-output limitation determining means for making a determination as to whether it is required to implement the output limitation of the electric motor, on the basis of a rise of a temperature of a component associated with the electric motor.

* * * * *